(12) United States Patent
Inoue et al.

(10) Patent No.: US 7,188,137 B2
(45) Date of Patent: Mar. 6, 2007

(54) SYSTEM AND METHOD FOR DISTRIBUTING ADVERTISEMENTS TO A PLURALITY OF USERS BASED UPON ADVERTISEMENT USER ATTRIBUTES AND ADVERTISEMENT PROVIDER ATTRIBUTES

(75) Inventors: Masahiro Inoue, Saitama (JP); Kazuyoshi Haruhara, Tokyo (JP)

(73) Assignee: Casio Computer Co., Ltd., Tokyo (JP)

( * ) Notice: Subject to any disclaimer, the term of this patent is extended or adjusted under 35 U.S.C. 154(b) by 912 days.

(21) Appl. No.: 09/811,724

(22) Filed: Mar. 19, 2001

(65) Prior Publication Data
US 2003/0208560 A1  Nov. 6, 2003

(30) Foreign Application Priority Data
Mar. 21, 2000 (JP) ............................. 2000-077991

(51) Int. Cl.
*G06F 15/16* (2006.01)
(52) U.S. Cl. .................. 709/203; 709/219; 705/14; 705/16
(58) Field of Classification Search ............... 709/219, 709/203; 705/14, 16, 15
See application file for complete search history.

(56) References Cited

U.S. PATENT DOCUMENTS

| 5,768,521 | A | * | 6/1998 | Dedrick ..................... 709/224 |
| 5,850,217 | A | | 12/1998 | Cole |
| 5,948,061 | A | * | 9/1999 | Merriman et al. .......... 709/219 |
| 6,182,050 | B1 | * | 1/2001 | Ballard ........................ 705/14 |
| 6,334,109 | B1 | * | 12/2001 | Kanevsky et al. ............ 705/14 |
| 6,351,745 | B1 | * | 2/2002 | Itakura et al. ............... 709/217 |
| 6,385,592 | B1 | * | 5/2002 | Angles et al. ................ 705/14 |
| 6,484,148 | B1 | * | 11/2002 | Boyd ........................... 705/14 |
| 6,539,420 | B1 | * | 3/2003 | Fields et al. ................. 709/224 |

(Continued)

FOREIGN PATENT DOCUMENTS

CA 2272061 5/1998

(Continued)

OTHER PUBLICATIONS

Japanese Official Action (Notification of Reason for Refusal) mailed Nov. 1, 2005 in counterpart Japanese Application, with English translation.
Chinese Office Action dated May 9, 2003 in counterpart Chinese Application with English language translation.
Rejection Decision dated Nov. 7, 2003 in counterpart Chinese Application with English language translation.
Reexamination Notification from Chinese Patent Office dated Sep. 14, 2005 and English language translation.

(Continued)

*Primary Examiner*—David Wiley
*Assistant Examiner*—Alina Boutah
(74) *Attorney, Agent, or Firm*—Frishauf, Holtz, Goodman & Chick, P.C.

(57) ABSTRACT

There is provided a system for selecting advertisement contents which are suitable for ad-user attributes, and for distributing the advertisement contents data and its corresponding advertisement attribute information through a computer communications network. Of a plurality of advertisements provided by an advertisement provider, a server computer selects a suitable advertisement for each advertisement user, in accordance with advertisement providing condition based on advertisement attribute information and advertisement user condition based on ad-user attributes of each ad user. The server computer transmits the selected advertisement data to each ad user through the communications network. Upon reception of the advertisement data form the server computer, the advertisement user print and issues the received advertisement on a receipt which is to be given to customer after each business transaction.

8 Claims, 31 Drawing Sheets

U.S. PATENT DOCUMENTS

2001/0042249 A1* 11/2001 Knepper et al. .............. 725/42
2004/0039784 A1* 2/2004 Jacobs et al. ............... 709/206

FOREIGN PATENT DOCUMENTS

| CA | 2294324 | 4/1999 |
|---|---|---|
| JP | KOKAI H9-091358 | 4/1997 |
| JP | KOKAI H10-020138 | 1/1998 |
| JP | 10-214383 A | 8/1998 |

OTHER PUBLICATIONS

Second Notification of Reexamination from Chinese Patent Office dated Jul. 4, 2006 with English language translation.

* cited by examiner

FIG.3

ADVERTISEMENT MASTER FILE M1

| ITEM | |
|---|---|
| AD ID | ···ID CODE OF AD |
| TITLE | ···NAME OF AD |
| AD PROVIDER CODE | ···ID CODE OF AD PROVIDER |
| AD PROVIDER NAME | ···NAME OF AD PROVIDER |
| URL OF AD DATA FILE | ···STORAGE DIRECTORY OF IMAGE DATA OF ADVERTISEMENT |
| FROM (DATE) | ···STARTING DATA (YEAR, MONTH, DATE) FOR ISSUING ADVERTISEMENT |
| TO (DATE) | ···ENDING DATA (YEAR, MONTH, DATE) FOR ISSUING ADVERTISEMENT |
| MAXIMUM NUMBER OF ADS TO BE ISSUED | ···MAXIMUM NUMBER OF ADS WHICH CAN BE ISSUED ON RECEIPTS |
| TARGET AGE GROUP CODE | ···1:AGE 12 AND UNDER; 2:AGE 19 AND UNDER; 3:20'S; ....... |
| TARGET AREA CODE | ···SET AREA CODES |
| TARGET STORE CODE | ···CODES OF STORES |
| TARGET SEX CODE | ···1:MALE; 2:FEMALE; 9:NO INDICATION |
| TARGET DAY CODE | ···0:SUNDAY...6:SATURDAY; 9:NO INDICATION |
| TARGET TIME CODE | ···TIME CODES FOR DIVIDING WHOLE DAY INTO SEVERAL BLOCKS |
| TOTAL NUMBER OF ISSUED ADS | ···NUMBER OF ISSUED ADS FROM SPECIFIED DATE FILE PRESENT TIME |
| REMAINING NUMBER OF RECEIPTS WITH AD | ···REMAINING NUMBER OF RECEIPTS WITH AD AT PRESENT TIME |
| CHARGED UNIT COST | |
| PAYMENT UNIT COST | |

AD PROVIDING CONDITIONS { TARGET AGE GROUP CODE through TARGET TIME CODE }

FIG.4

STORE MASTER FILE M2

| ITEM | |
|---|---|
| STORE ID | ···ID CODE OF STORE |
| STORE NAME | ···NAME OF STORE |
| IP ADDRESS | ···IP ADDRESS OF ECR TERMINAL DEVICE |
| MAXIMUM NUMBER OF ADS | ···MAXIMUM NUMBER OF ADS TO BE STORED |
| STORE CODE | ···STORE CODES |
| AGE GROUP CODE | ···1:AGE 12 AND UNDER; 2:AGE 19 AND UNDER; 3:20'S........ |
| AREA CODE | ···SET AREA CODES |
| SEX CODE | ···1:MALE; 2:FEMALE; 9:NO INDICATION |
| CLOSED ON | ···0:SUNDAY..... 6:SATURDAY; 9:OPEN THROUGHOUT YEAR |
| FROM (TIME) | |
| TO (TIME) | |

AD USER CONDITIONS { STORE CODE, AGE GROUP CODE, AREA CODE, SEX CODE }

FIG.5A

AD FILE F1

| ITEM | |
|---|---|
| STORE ID | ···ID CODE OF STORE |
| AD ID | ···ID CODE OF AD |

FIG.5B

TRANSMISSION DATA FILE F2

| ITEM | |
|---|---|
| STORE ID | ···ID CODE OF STORE |
| AD ID | ···ID CODE OF AD |
| URL OF DATA FILE | ···STORAGE DIRECTORY OF IMAGE DATA OF ADVERTISEMENT |
| TIME CODE | |
| SEX CODE | |
| AGE GROUP CODE | |

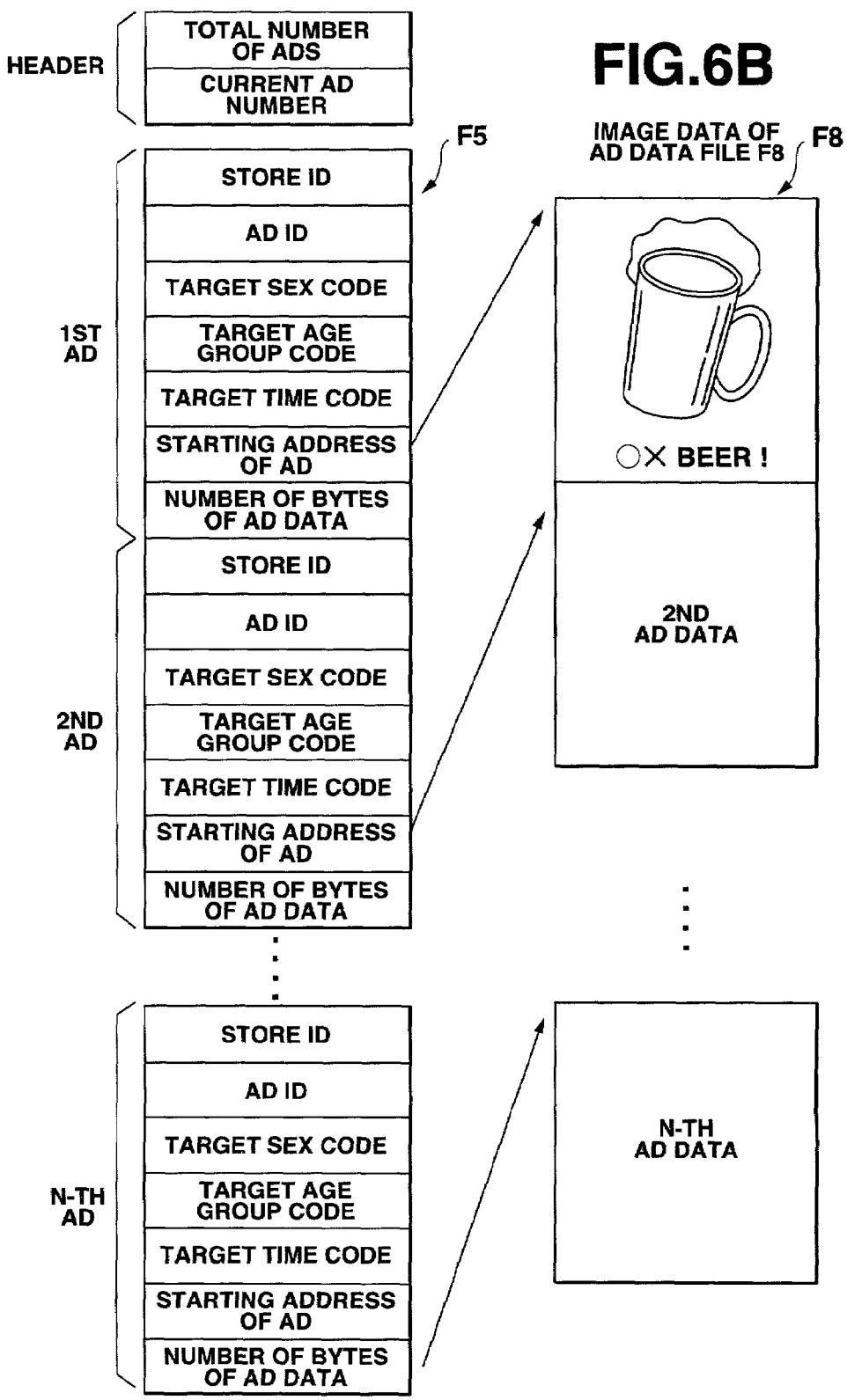

FIG.8

PRINT-LOG FILE F6

| ITEM |
|---|
| DATE |
| AD ID |
| STORE ID |
| PRINTING TIME |

DATE ··· PRESENT DATE

FIG.9A

AD-ISSUING INFORMATION FILE F3

| ITEM |
|---|
| AD ID |
| DATE |
| NUMBER OF ISSUED ADS |

FIG.9B

AD-ISSUING INFORMATION FILE F4

| ITEM |
|---|
| STORE ID |
| DATE |
| NUMBER OF ISSUED ADS |

FIG.10A

TRANSMISSION-RECORD REPORTING FILE F7

| ITEM |
| --- |
| DATE |
| AD ID |
| TITLE |
| AD PROVIDER CODE |
| FROM (DATE) |
| NUMBER OF ISSUED ADS |
| TOTAL NUMBER OF ISSUED ADS |
| MAXIMUM NUMBER OF ADS TO BE ISSUED |
| USAGE RATE |
| WARNING FLAG |

··· 0:FAIR; 1:LOWER THAN EXPECTED USAGE RATE (AVERAGE OF 10% OR LOWER)

FIG.10B

AD PROVIDER MASTER FILE M3

| ITEM |
| --- |
| AD PROVIDER CODE |
| AD PROVIDER NAME |
| EMAIL ADDRESS |

ECR TERMINAL DEVICE

FIG.26

LIST OF REGISTERED ADS

REGISTRATION OF AD DATA

● AD PROVIDER | DEF CONFECTIONERY

| AD ID | TITLE | FROM | MAXIMUM NUMBER | NUMBER OF ISSUED ADS |
|---|---|---|---|---|
| 000214 | ALMOND CHOCOLATE | OCT/01/1999 | 100,000 | 87,965 |
| 000378 | CHRISTMAS CAMPAIGN | NOV/01/1999 | 100,000 | 82,286 |
| 000486 | ICE CREAM | DEC/15/1999 | 500,000 | 105,650 |
| 000491 | SPECIAL CAMPAIGN | JAN/20/2000 | 500,000 | 25,460 |

CURRENTLY REGISTERED 4

NEW        CANCEL

FIG.27

REGISTRATION OF AD INFORMATION (NO IMAGE PASTED)

- AD PROVIDER NAME : DEF CONFECTIONERY
- AD ID : 001249
- TITLE
- FROM
- MAXIMUM NUMBER
- TARGET AGE GROUP: AGE 12 OR LOWER ▶
- TARGET AREA: NATIONWIDE ▶
- STORE TYPE: GROCERY STORE ▶
- TARGET SEX CODE: MALE ▶
- TARGET DAY CODE: WEEKEND ▶
- TARGET TIME CODE: NONE ▶

PASTE AD IMAGE IN HERE

DAILY REPORTING EMAIL

SENDER : AD SERVICE@ABC.COM
ADDRESS : XYZ@DEF.COM
DATE : 10 FEB, 2000
SUBJECT : REPORT ON USAGE CONTEXT

● AD TRANSMISSION SERVICE (DAILY REPORT)

THANK YOU FOR USING OUR AD TRANSMISSION SERVICE!
USAGE CONTEXTS OF YESTERDAY'S AD TRANSMISSION ARE AS FOLLOWS:

DEF CONFECTIONERY

FEB.8, 2000

| AD ID | TITLE | FROM | NUMBER OF ISSUED ADS | TOTAL NUMBER OF ISSUED ADS | MAXIMUM NUMBER | USAGE RATE |
|---|---|---|---|---|---|---|
| 000214 | ALMOND CHOCOLATE | OCT/01/1999 | 6,582 | 87,965 | 100,000 | 88% |
| 000378 | ICE CREAM | NOV/01/1999 | 8,892 | 105,650 | 500,000 | 21% |
| 000491 | SPECIAL CAMPAIGN | JAN/20/2000 | 9,800 | 25,460 | 500,000 | 5% |

FIG.31

REPORTING EMAIL (FOR CHECKING AD INFORMATION)

SENDER : AD SERVICE@ABC.COM
ADDRESS : XYZ@DEF.COM
DATE : 9 FEB, 2000
SUBJECT : REQUEST FOR CHECKING AD INFORMATION

●AD TRANSMISSION SERVICE (REQUEST FOR CHECKING AD INFORMATION)

<<REQUEST FOR CHECKING AD INFORMATION>>

THANK YOU FOR USING ECR AD TRANSMISSION SERVICE!
USAGE CONTEXT OF INDICATED AD IS NOT WELL.

PLEASE HAVE AD ATTRIBUTES SET WIDER

DEF CONFECTIONERY

FEB.8, 2000

| AD ID | TITLE | FROM | NUMBER OF ISSUED ADS | TOTAL NUMBER OF ISSUED ADS | MAXIMUM NUMBER | USAGE RATE |
|---|---|---|---|---|---|---|
| 000378 | ICE CREAM | NOV/01/1999 | 1,100 | 105,650 | 500,000 | 21% |

AVERAGE NUMBER OF ISSUED ADS 12,529

SYSTEM AND METHOD FOR DISTRIBUTING ADVERTISEMENTS TO A PLURALITY OF USERS BASED UPON ADVERTISEMENT USER ATTRIBUTES AND ADVERTISEMENT PROVIDER ATTRIBUTES

BACKGROUND OF THE INVENTION

1. Field of the Invention

The present invention relates to a system and method for distributing advertisements to a plurality of advertisement users, and more particularly, to a system and method for distributing advertisements which are selected in accordance with advertisement user attributes and advertisement provider attribute.

2. Description of the Related Art

Conventionally, each retail store in distribution industry registers sale data of any goods purchased by customers, using an ECR (Electronic Cash Register) or a POS (Point-Of-sales) terminal device as a sales-data processor. After each business transaction, the processor issues a receipt showing a detailed report of the transaction, and provides each customer with the issued receipt.

There are different attributes and characteristics, including business types, areas, dealing goods, particularly-demanded goods, age groups of customers, depending on each store. For sales promotion based on such attributes and characteristics, when issuing a receipt to a customer, the processor prints not only the detailed report of business transaction, bus also other information including various messages for informing the customer of bargain sale, etc. In addition, the processor of each store provides the customers with a point-saving card or a bonus coupon, in accordance with the purchased amount or the like.

However, those messages which are the means used for the sales promotion are created by the stores. In this circumstances, such messages have not much contributed as means for the sales promotion. The providing of the coupons may have caused some customers to regularly purchase goods at the stores. However, the problem in here is that the so-far provided services or messages for the sales promotion can not make a variety of customers of a target age group(s) desire to buy and shop goods at the stores.

It is also a well-known fact that, in franchise stores, message and image information of a particular product are sent from the head office of the franchise stores, and displayed on a display screen which can be seen by the customers of the stores. However, such information is also the information created and given by the stores. Even if such information are continuously displayed on the display screen and revealed to an infinite number of customers, unless the customers pay attention to the display screen, the advertisement in the form of message or image data is useless.

SUMMARY OF THE INVENTION

The present invention has been made in consideration of the above. It is accordingly an object of the present invention to provide an advertisement distribution system which selects only useful advertisements corresponding to store attributes of a target store and transmits the selected advertisements to the store.

Another object thereof is to provide a store terminal device, which is prepared at each store receiving advertisements corresponding to store attributes of the store, outputs an advertisement which is useful for the store in association with the store attributes, and provides an advertisement manager with usage context of the received advertisements.

Still another object thereof is to provide a method for calculating an amount of money for advertisement charges based on usage context of advertisements transmitted through a network.

In order to accomplish the above objects, according to the first aspect of the present invention, there is provided an advertisement distribution system which receives advertisement contents from at least one advertisement provider through a communications network, and provides at least one advertisement user with the received advertisement contents through the communications network, the system comprising:

an advertisement information storage unit which stores advertisement contents received from the at least one advertisement provider in association with advertisement provider information, for controlling providing of advertisement and corresponding to the received advertisement contents;

an advertisement-user information storage unit which stores advertisement usage information, for specifying a desired advertisement, of the at least one advertisement user;

an advertisement extraction unit which extracts advertisement contents corresponding to advertisement provider information in association with the stored advertisement usage information; and a transmission unit which transmits the advertisement contents extracted by the advertisement extraction unit to the at least one advertisement user having requested the advertisement contents.

According to the structure, the advertisement contents are extracted and transmitted to a corresponding store, based on the store attributes using the advertisements contents and the advertisement attributes of the advertisements sent from the advertisement provider. Thus, only advertisement contents which are beneficial both for the advertisement provider and user are transmitted therebetween.

In order to accomplish the above objects, according to the second aspect of the present invention, there is provided a store terminal device which receives advertisement contents to be sent by an advertisement provider from an advertisement server connected to the store terminal device through a communications network, the device comprising:

an advertisement content storage unit which receives a predetermined number of advertisement contents, which are selected and transmitted in accordance with store attribute information of a store having sent the store attribute information from the advertisement server, and advertisement attribute information corresponding to the advertisement contents, and sequentially store the received advertisement contents and advertisement attribute information;

an advertisement content specification unit which specifies at least one advertisement content included in the predetermined number of advertisement contents stored in the advertisement content storage unit, when to use an advertisement;

an advertisement outputting unit which outputs the advertisement content specified by the advertisement content specification unit;

an advertisement-usage-context management unit which updates and retains, every time the advertisement content output by the advertisement outputting unit, advertisement usage context corresponding to the output advertisement content; and a sending unit which sends the advertisement usage context retained by the advertisement-usage-context management unit to the advertisement server at predetermined intervals.

According to the above structure, the advertisement specification unit specifies and outputs one advertisement content included in the predetermined number of advertisement contents which are stored and sent from the advertisement server. Hence, a variety of advertisements are output, during the usage of the advertisements. The advertisement-usage-context management unit can manages the usage context for each of the predetermined number of advertisement contents.

In order to achieve the above objects, according to the third aspect of the present invention, there is provided a method for receiving advertisement contents sent form an advertisement provider using an advertisement provider terminal through a communications network, and sending the received advertisement contents to at least one advertisement user from an advertisement server, the method comprising the steps of:

storing the advertisement content sent from the advertisement provider using the advertisement provider terminal and advertisement attribute information in association with each other;

storing advertisement user information sent form the at least one advertisement user using the sent advertisement contents;

retrieving advertisement attribute information conforming to the stored advertisement user information, and extracting advertisement contents corresponding to he retrieved advertisement attribute information;

sending the extracted advertisement contents to the at least one advertisement user;

receiving predetermined advertisement contents sent from the advertisement server to the at least one advertisement user and advertisement attribute information corresponding to the predetermined advertisement contents, and storing the received advertisement contents and the advertisement attribute information sequentially in received order;

outputting and specifying one advertisement content included in the stored advertisement contents, when using an advertisement; and outputting the advertisement content specified by the outputting step.

According to the above structure, the advertisement contents can be transmitted to each store, based on the advertisement attribute information sent from the advertisement provider and the store attribute information sent from each store. In addition, every time the advertisement is to be used, a corresponding one of the advertisement contents is specified and output.

BRIEF DESCRIPTION OF THE DRAWINGS

These objects and other objects and advantages of the present invention will become more apparent upon reading of the following detailed description and the accompanying drawings in which:

FIG. 3 is a diagram showing the record structure of an advertisement master file M1;

FIG. 4 is a diagram showing the structure of records of a store master file M2;

FIG. 5A is a diagram showing the structure of a prepared-advertisement file F1 according to store, and FIG. 5B is a diagram showing the structure of transmission data file F2 according to store;

FIG. 6A is a diagram showing the record structure of an advertisement information file F5, and FIG. 6B is a diagram showing the record structure of an advertisement data file F8;

FIG. 8 is a diagram showing the record structure of a print-log file F6;

FIG. 9A is a diagram showing the record structure of an ad-issuing information file F3 according to advertisement, and FIG. 9B is a diagram showing the record structure of an ad-issuing information file F4 according to store;

FIG. 10A is a diagram showing the record structure of a transmission-record reporting file F7, and FIG. 10B is a diagram showing the record structure of an advertisement-provider master file M3;

FIG. 26 is a diagram showing a display for displaying a list of registered ads;

FIG. 27 is a diagram showing a registration display for registering advertisement information;

FIG. 30 is a diagram showing a display screen of a reporting email (display report); and FIG. 31 is a diagram showing a display screen of a reporting email (request for checking advertisement data).

DETAILED DESCRIPTION OF THE PREFERRED EMBODIMENT

Figure 1:
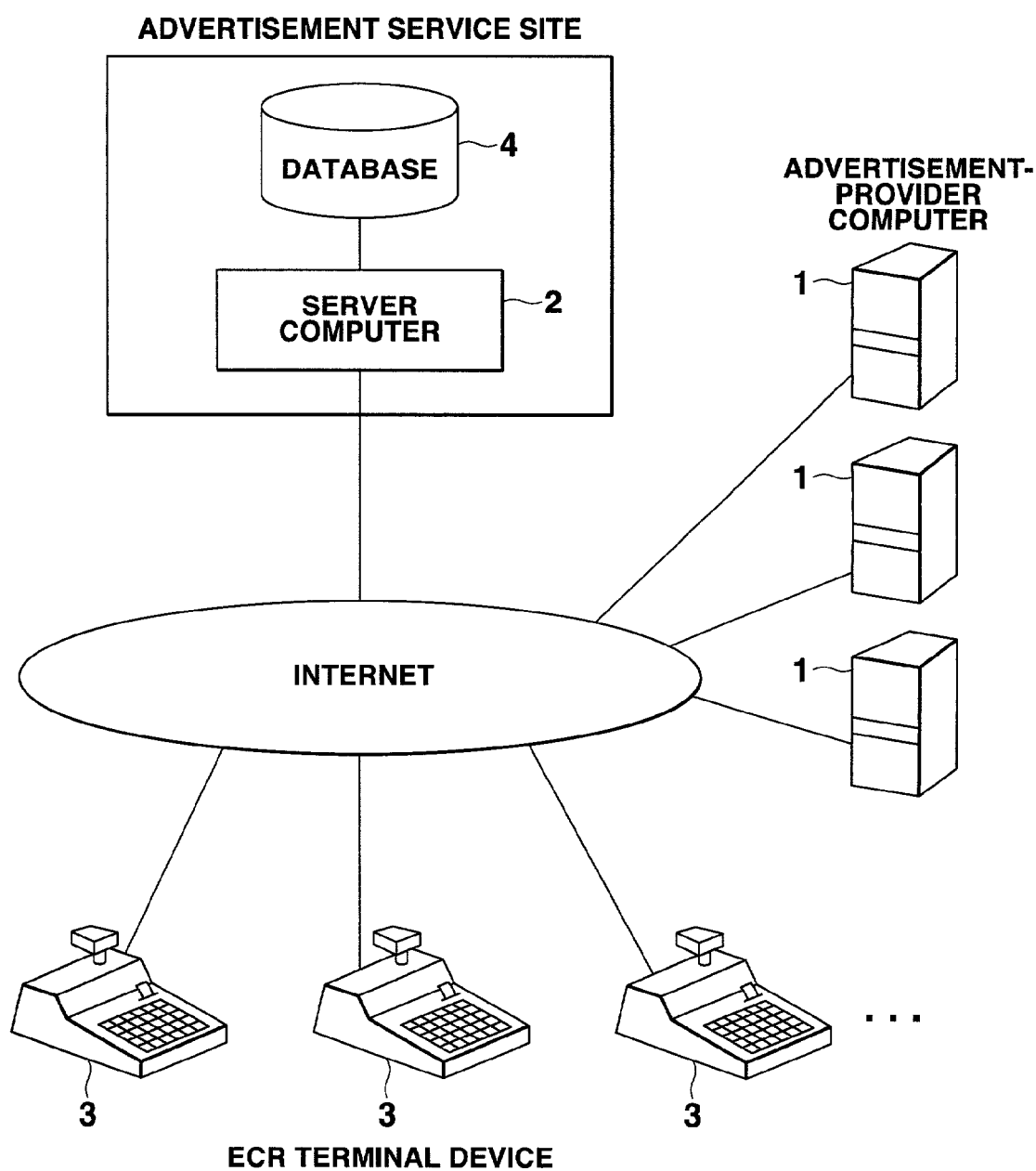
FIG. 1 is a block diagram showing an advertisement distribution system for managing advertisement data through a communications network.

FIG. 1 is a block diagram showing an advertisement management system for managing advertisement data through a network.

The advertisement management system comprises: a plurality of computers (advertisement provider computers) 1-1 to 1-$n$, which are arranged respectively at advertisement providers providing advertisement data; a server computer 2 of an advertisement service site for providing various services while managing the advertisement data; a database 4 which is connected to the server computer 2; and a plurality of sales-data processors (Electronic Cash Register terminal device) which are arranged at stores using the advertisement data. The plurality of computers 1-1 to 1-$n$, the server computer 2, the database 4, and the sales-data processors 3-1 to 3-$n$ are connected with each other through a network.

In the advertisement data management system, an advertisement-service manager makes a contract with each advertisement provider who requests to put an advertisement for sales promotion in a predetermined medium or the like. The advertisement-service manager makes a contract with each store (advertisement user) intending to use advertisements provided by the advertisement provider. In addition, the advertisement-service manager manages the advertisement data transmitted between the advertisement provider and the advertisement user via the Internet.

In this embodiment, the advertisement data stands for an advertisement, toward customers of a retail store, arbitrarily provided by the advertisement provider. The provided advertisement is advertisement image data to be printed, including static image data, character data, etc. It is preferred that such advertisement data is one for simply and accurately expressing a target product or services. The structure of such advertisement data is arbitrary.

The advertisement data which is provided by the advertisement provider and the advertisement user is registered in the database 4 which is connected to the server computer 2 of the advertisement service site, and periodically transmitted to the ECR terminal devices 3 of contracted stores. In each contracted store, plural items (pieces) of advertisement data sent from the advertisement service site are stored in its ECR terminal device 3. Upon completion of business-transaction registration, one piece of advertisement data which is selected from the plural items of advertisement data is printed on a receipt. In this embodiment, a receipt showing the details of a business transaction, to be provided to the customer after the transaction, is employed as an advertisement medium. Hence, the advertisement is shown toward only the customers of a business enterprise. In this case, various items of advertisement data are printed.

The advertisement service site stores and manages advertisement-providing conditions, in the form of a database, in the server computer 2 which is set in the site. Stored in the database are: advertisement conditions including sex information, age group, an area, of target customers to be provided with the advertisement; and the unit cost for inserting the advertisement data into each receipt. The advertisement service site stores advertisement user conditions (i.e., store attributes) in the form of a database in the server computer 2. The store attributes, which are sent from contracted stores, include business types of advertisement users, areas, dealing goods, services, sex information and age groups of customers.

In the above state where the advertisement providing conditions and the advertisement user conditions are managed and stored, the server computer 2 selects a piece of advertisement data based on the above conditions, and transmits only the selected advertisement data corresponding to a particular store to the ECR terminal device 3 of the store. Particularly, in the case where some advertisement providing conditions, such as business type, area and customer information of store, are requested from an advertisement provider, advertisement data is selected and transmitted in a manner corresponding to each store, in consideration of the attributes of each store.

The ECR terminal device 3 of each store records past data representing a usage amount of advertisement data which has been printed on receipts. The ECR terminal device 3 sends the recorded past data to the server computer 2 of the advertisement service site. Based on the past data, the ECR terminal device 3 issues a bill to the advertisement provider, and calculates a payment amount of the usage of advertisement data used in each store.

In this case, the server computer 2 sums the usage amount of the advertisement data according to advertisement/store, and creates a bill for advertisement data in accordance with the summed amount.

Further, the advertisement service site periodically informs each advertisement provider of the usage contexts of advertisement through an email, based on summed result of the usage amount.

Figure 2:
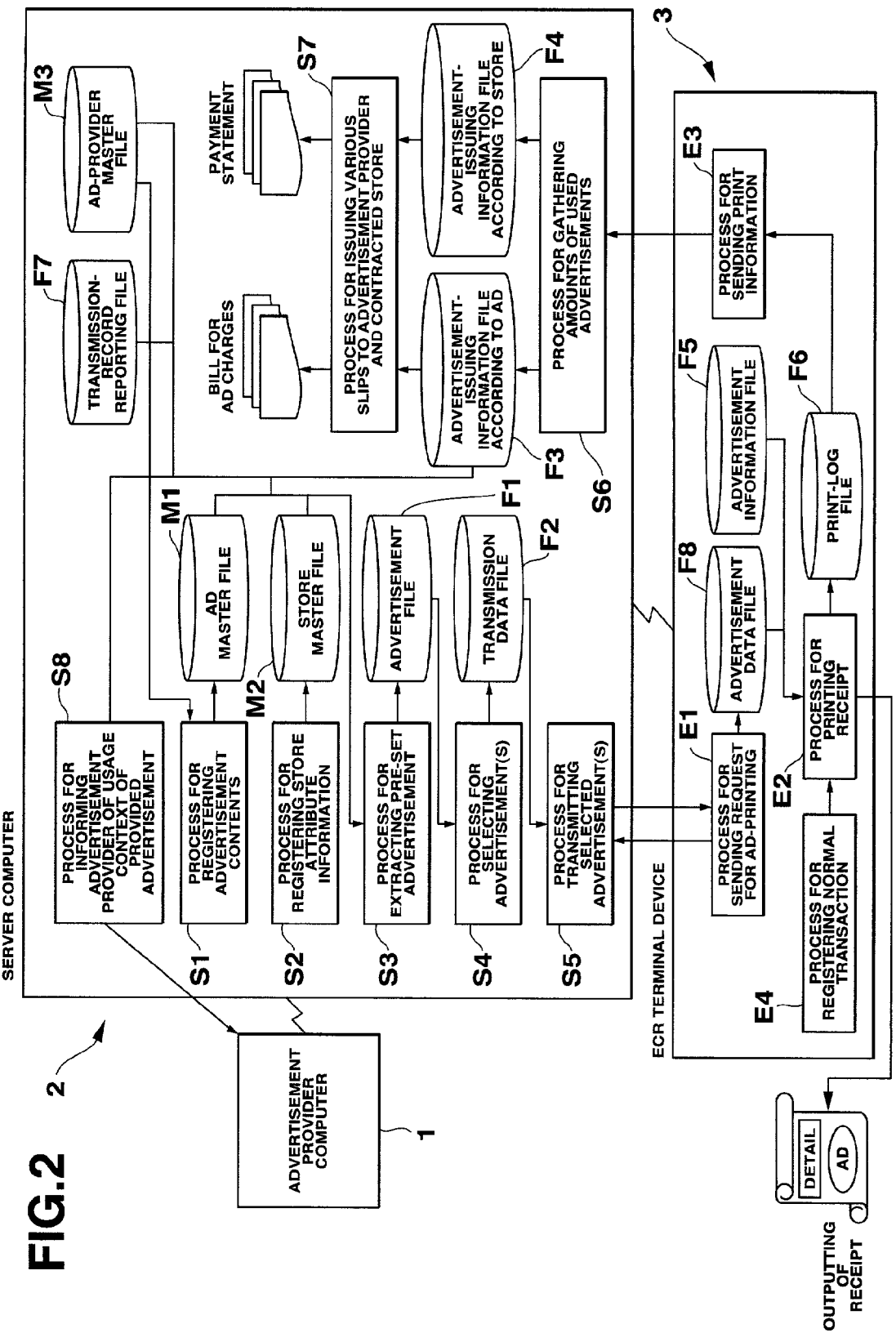
FIG. 2 is a block diagram ideally showing processes carried out by a server computer 2 and an ECR terminal device 3 which are included in the advertisement distribution system.

FIG. 2 is a functional block diagram ideally showing the above-described processes which are carried out by the advertisement data management system of this embodiment. The server computer 2 and the ECR terminal device, which is prepared in each store, have the structure for achieving each process shown FIG. 2.

The server computer 2 carries out a process SI for registering advertisement data and advertisement management information from the advertisement-provider computer 1. In addition, the server computer 2 internally carries out: a process S2 for registering store attribute information; a process S3 for extracting a prepared-advertisement for a corresponding store; a process S4 for selecting predetermined piece(s) of advertisement data to be transmitted; a process S5 for transmitting selected piece(s) of advertisement data to the ECR terminal device 3 of a corresponding store; and a process S6 for calculating amounts of issued advertisements. Further, the server computer 2 carries out a process S7 for issuing various slips to a corresponding advertisement provider and advertisement user, as a later process of advertisement usage, and a process S8 for informing the advertisement provider of usage context of provided advertisement.

In the process S1, the server computer 2 of the advertisement service site newly registers or corrects advertisement data in the database 4 (refer to FIG. 1), when advertisement data and its corresponding advertisement management information, etc. are sent from the advertisement-provider computer 1 to the service site. In this case, if the advertisement-provider computer 1 sends, to the server computer 2, advertisement management information (including an advertisement ID, advertisement provider name, etc.) of the registered advertisement and the advertisement providing conditions, such as sex information, age group, area, shopping time of target customers to be provided with the registered advertisement data, the server computer 2 registers the advertisement providing conditions corresponding to the advertisement data, in the advertisement master file M1.

Accordingly, in the process S1, the server computer 2 registers the advertisement data sent from the advertisement-provider computer 1 through the Internet in the advertisement database 4. Additionally, the server computer 2 registers the advertisement providing conditions sent together with the advertisement data in the advertisement master file M1.

FIG. 3 is a diagram illustrating the record structure of the advertisement master file M1, and shows the data contents of each record in the master file M1. The contents of each record in the master file M1 are given mainly by the advertisement provider. Each of the record includes data items of "Advertisement ID", "Title", "Advertisement Provider Code", "Advertisement Provider Name", "URL (Uniform Resource Locator) of Advertisement Data File", "From (Date)", "Until (Date)", and "Maximum Number of Advertisements to be Issued". The data items of "Advertisement ID" and "Title" are to identify each advertisement. Particularly, the data item of "Advertisement ID" is advertisement ID information which is issued by the server computer 2. The data items of "Advertisement Provider Code" are "Advertisement Provider Name" to identify a corresponding advertisement provider. The data item of "URL (Uniform Resource Locator) of Advertisement Data File" is to specify a storage directory of advertisement data in the database 4. The data items of "From (Date)" and "To (Date)" are to indicate the starting date for issuing advertisement data and the ending date of the insertion of advertisement data. The data item of "Maximum Number of Advertisements to be Issued" is to specify the maximum number of receipts to be issued with advertisement.

The charges for the advertisement insertion are calculated in accordance with the number of receipts with advertisement data. Not to exceed the budget, the maximum number of items of data to be printed on receipts is set. In the case where the total number items of data which are printed on receipts exceeds the set maximum number, the advertisement data is temporarily suspended to be issued.

Additionally, each record in the advertisement master file M1 includes data items, as advertisement-providing conditions, of "Target Age Group Code", "Target Area Code", "Target Store Code", "Target Sex Code", "Target Day Code", and "Target Time Code".

These advertisement-providing conditions are set, if the advertisement provider desires to insert an advertisement, focusing on a particular group of customers to be provided with the advertisement, e.g. if the advertisement provider desires to focus on those who are teenagers, girls, at stationary stores in the Tokyo area between 2 and 3 o'clock on Sunday.

Each record in the advertisement master file M1 further includes data items of "Total Number of Issued Advertisements", "Remaining Number of Receipts to be Issued with Advertisement", "Charged Unit Cost", and "Payment Unit Cost". The data item of "Total Number of Issued Receipts with Advertisement" is to specify the total number of issued receipts with advertisement data since the date the advertisement data began to be provided until the present date. The data item of "Remaining Number of Receipts to be Issued with Advertisement" is to specify the remaining number of receipts to be issued, based on "Maximum Number of Receipts to be Issued with Advertisement Data". Both of the above data items of "Total Number of Receipts to be Issued with Advertisement" and "Remaining Number of Receipts to be Issued" are generated by the server computer 2. The data items of "Charged Unit Cost" and "Payment Unit Cost" are to specify a unit cost of advertisement per receipt, which is set when to make a contract between the advertisement service manager and the advertisement provider/store.

The process S2 is a process for registering store attributes, as advertisement user conditions, given by each store in the store master file M2. In the process S1, advertisement data and/or advertisement providing conditions are received and registered through the Internet. On the other hand, in the process S2, the data to be registered is input on the side of the advertisement service manager, without connecting to the Internet. For example, registration forms with a list of store attribute items are distributed at contracted stores in advance, and collected, after being filled in, via fax. Then, the information written in the registration forms are registered in the store master file M2 by manipulation of the server computer 2.

Particularly, if the function of the process S2 is installed in the ECR terminal device 3 and transmitted to the server computer 2 through the Internet, the advertisement user who is not really used to manipulate the ECR terminal device 3, etc. may make an input error or error manipulation. To avoid such context, the registration forms are distributed to the stores in advance, and collected after being filled in. This registration process is done when a store newly becomes a member.

FIG. 4 shows the record structure of the store master file M2, and illustrates the data contents of each record. The data contents of this master file M2 are given by newly-registered store. The store master file M2 includes data items of "Store ID", "Store Name", "IP (Internet Protocol) Address", and "Maximum Number of Advertisement Data Items to be Stored".

The data item of "Maximum Number of Advertisement Data Items to be Stored" is to specify the maximum number of advertisement data items which can be stored in the ECR terminal device 3. Generally speaking, the ECR terminal device 3 includes relatively a small capacity of memory, instead of a large capacity of memory. Hence, the storage amount of advertisement data including image data is determined in accordance with the memory capacity of the memory therein. The data item of "Maximum Number of Receipts to be Issued with Advertisement" is to specify the maximum number of advertisement data items to be stored, in accordance with a model of the ECR terminal device. In such a structure where the maximum number items of advertisement data to be stored is stored in the ECR terminal device 3, a variety of advertisements can be issued toward a plurality of customers, respectively.

The store master file M2 further includes data items of "Store Code", "Age Group Code", "Area Code", "Sex Code", "Closed On", "From (Time)", and "To (Time)", as store attributes of the advertisement user conditions.

The data item of "Store Code" is to specify a business type of a corresponding store, e.g. a stationary store, cleaner's, etc. the data items of "Age Group Code" and "Sex Code" are to specify the age groups and sex information of customers of the store. The data item of "Area Code" is to specify an area where the store is located.

In the process S3, the data contents of the advertisement master file M1 and store master file M2 are compared and referred, thereby to extract advertisement data corresponding to a predetermined store. This process S3 is carried out, for example, once after or before the opening hours of the corresponding store every day. The advertisement management information as the advertisement-providing conditions stored in the advertisement master file M1 are compared with the store attributes as the advertisement user conditions stored in the store master file M2.

In this case, if the number of extracted prepared-advertisements, i.e. the number items of advertisement data which can be stored in the internal memory of the ECR 4terminal device 3, does not reach the maximum number, more data item(s) can automatically be employed for extracting the prepared advertisements again.

Accordingly, once the advertisement data corresponding to each store are extracted by the execution of the process S3, the extracted advertisement data is stored in an advertisement file F1 according to store. This advertisement file F1 stores prepared advertisement data to be transmitted to target store(s). In the process S4, a predetermined number items of advertisement data which are extracted from the advertisement according to store are transmitted to the ECR terminal device 3 of a corresponding store.

FIG. 5A shows the record structure of the advertisement file F1, and illustrates the data contents of each record. The advertisement file F1 includes data items of "Store ID" and "Advertisement ID". The data item of "Store ID" is obtained from the store master file M2, while the data item of "Advertisement ID" is obtained from the advertisement master file M1, record by record. The advertisement file F1 shows which advertisement(s) is (are) extracted for which store.

The process S4 is a process for selecting a predetermined number of advertisements, for each store, of target advertisements stored in the advertisement file F1. In the above-described process S3, a number of advertisements, which is larger than the maximum number items of advertisement data to be stored, may be extracted. However, there is a limit to store the items of advertisement data to be stored in the internal memory of the ECR terminal device 3. Hence, in the process S4, the number of extracted advertisements is limited to the maximum number of items of advertisement data to be stored.

The internal memory of the ECR terminal device 3 can store ten items of advertisement data with a fixed length, for example. In this case, if one hundred items of advertisement data are extracted, ten out of one hundred items of advertisement data are limited to be stored. If the first ten items of advertisement data are extracted, and the rest of items of the data are ignored, the same advertisement is extracted every time the advertisement is inserted into a receipt, as long as new advertisement is not added. As a result, a small number of items of advertisement data are repeatedly inserted to receipts to be handed in to customers who thus find nothing fresh in the advertisement. In consideration of this, to equally extract items of advertisement data, the items of data are set to be extracted with random numbers. That is, the items of advertisement data are set to be extracted randomly from the plurality of items of advertisement data. Having performed this, the items of advertisement data extracted from the advertisement file F1 are stored in a transmission data file F2 according to store.

FIG. 5B shows the record structure of the transmission data file F2. The transmission data file F2 is to store advertisement management information including advertisement information stored in the advertisement file F1 in association with each record. The transmission data file F2 includes data items of "Store ID", "Advertisement ID", "URL of Advertisement Data File", "Time Code", "Sex Code", and "Age Group Code". The data items of "URL of Advertisement Data File", "Time Code", "Sex Code", and "Age Group Code" are the information retrieved from the advertisement master file M1. Such code information are transmitted to the ECR terminal devices 3 of contracted stores together with the advertisement data, by carrying out the process S5, as will be explained later. The ECR terminal device 3 of each contracted store extracts an advertisement data piece, which satisfies some necessary conditions based on the above data items, of the plurality of items of transmitted advertisement data. Then, the extracted advertisement data piece is inserted so as to be printed on receipts.

In the process 5, the advertisement management information of the transmission data file F2, which is created by the execution of the process S4, is transmitted to the ECR terminal device 3 of each contracted store. Upon reception of a request for transmission of advertisement data from the ECR terminal device 3 of a corresponding contracted store, the server computer 2 searches the transmission data file F2 for corresponding advertisement data based on a store ID of the store. Then, the server computer 2 sends the searched result toe the ECR terminal device 3 of the store through the Internet. At this time, the server computer 2 searches the advertisement database 4 based on the data of "URL of Advertisement Data File" inside the transmission data file 2, retrieves corresponding advertisement data, and sends the retrieved advertisement data to the ECR terminal device 3 of the store, together with the advertisement management information.

The ECR terminal device 3 carries out: a process E for requesting for ad-printing; a process E2 for printing receipts; and a process E3 for sending print-log information.

In the process E1, the ECR terminal device 3 connects to the server computer 2 through the Internet based on a request from an advertisement user, sends a request for transmission of advertisement data, and receives advertisement data and its corresponding advertisement management information from the server computer 2. Thus sent advertisement data and its advertisement management information within the range of the maximum number of items of data are stored in and managed by the ECR terminal device 3.

FIG. 6A shows the record structure of an advertisement information file F5. The advertisement information file F5 is to store advertisement management information according to advertisement. The advertisement information file F5 includes header items of "Total Amount of Advertisements" and "Current Advertisement Number". The data of "Total Amount of Advertisements" specifies the total amount of advertisements which are transmitted, while the data of "Current Advertisement Number" specifies a pointer to the advertisement management information for specifying the currently-issued advertisement. The value of the pointer is incremented by 1, every time a receipt is printed, and initialized when the value reaches the "Maximum Number of Advertisement Data Items".

In the advertisement information file F5, following the header items, records including advertisement management information items are set for advertisements, respectively. Each of the records includes those of "Store ID", "Advertisement ID", "Sex Code", "Target Age Group Code", "Target Time Code", "Start Address of Advertisement Data", and "Number of Bites of Advertisement Data".

Stored in the item of "Start Address of Advertisement Data" is a pointer specifying the head address of each advertisement data with a fixed length. The advertisement data is stored in an advertisement data file F8 of the ECR terminal device 3 where the advertisement data is actually stored. The data item of "Number of Bytes of Advertisement Data" is to specify the data size of corresponding advertisement data. Based on the data of "Start Address of Advertisement Data" and "Number of Bytes of Advertisement Data", the data area where the corresponding advertisement data to be output is stored is specified.

Each of the records in the advertisement information file F5 is sequentially stored in a manner corresponding to the first to an "n-th" advertisement data. In this sequential order, i.e. from the first to the "n-th", each of the advertisement data items is specified one after another. Usually, the data areas of the advertisement data to be output are specified sequentially in the above order one after another.

FIG. 6B shows an advertisement data file F8. In this advertisement data file F8, the items of advertisement data are stored sequentially in an order of the corresponding records of the advertisement information file F5, in one-to-one correspondence with each other. The advertisement data file F8 stores a predetermined number of items of data each having a fixed length conforming to the size of receipts. The predetermined number of items of data, which is set in accordance with the data capacity of the advertisement data file F8, is the maximum number of items of advertisement data. In response to a request for transmission of advertisement data from the ECR terminal device 3, the server computer 2 periodically sends advertisement data within the range of the maximum number of pieces of advertisement data at, for example, a predetermined time before or after the opening hours of the store. Every time the server computer 2 sends such data, the entire data of the advertisement data file F8 and advertisement information file F5 are updated.

In the process E2, upon completion of sales data registration, every time business transaction is completed, the registered data, such as the total amount of the transaction, is printed onto a receipt, and advertisement data is printed onto the same receipt.

In this case, the ECR terminal device 3 refers to the advertisement information file F5, and extracts corresponding advertisement data in accordance with the order in which the advertisement management information is stored in the file F5. The operator of the ECR terminal device 3 may input sex information, age group of a customer, as customer information. In this case, the ECR terminal device 3 extracts advertisement management information corresponding to the input customer information from the advertisement information file F5. Then, the ECR terminal device 3 reads out advertisement data corresponding to the extracted advertisement management information from the advertisement data file F8 so as to be printed. In the case where the customer information is input from the operator of the ECR terminal device 3, specified advertisement data is given priority in being output instead of being output in a pre-set order.

Figure 7:
FIG. 7 is a diagram showing an example of receipt to be issued.

FIG. 7 is a diagram exemplifying a printed receipt. The receipt includes a header section, a detailed section, and an advertisement section. The header section includes the store name, address, etc. The detailed section includes date, detailed statement of purchased products. The advertisement section includes printed advertisement data. The size (in length) of the advertisement section varies depending on the size of each advertisement. However, the size (in width) of the advertisement section is fixed.

In a print-log file F6, print log information for one record is sequentially written, every time advertisement data is printed onto a receipt. The print log information is totally sent to the server computer 2 by the execution of the process S3, as will more specifically be explained later, at a predetermined time before or after opening hours of the store having the ECR terminal device 3, every day.

FIG. 8 is a diagram showing the record structure of the print-log file F6. Each record of the print-log file F6 includes data items of "Date (Year, Month, Date)", "Advertisement ID", "Store ID", and "Printing Time", in association with each advertisement. The data items of "Date" and "Printing Time" are to show the date and time at which printing of advertisement data is performed are store, whereas the data item of "Advertisement ID" is to specify an Advertisement ID of the advertisement data.

In the process E3, the ECR terminal device 3 sends the data contents of the print-log file F6 to the server computer 2. The process E3 is performed once at a predetermined time after closing the store, every day.

In the process S6, the server computer 2 receives the print log file sent from the ECR terminal device 3 of each contracted store, classifies the received print log file according to advertisement and store. Subsequently, the server computer 2 sets any necessary data item in a corresponding ad-issuing information file F3 according to advertisement and an ad-issuing information file F4 according to store.

The process S7 is a process for summing the data stored in the ad-issuing information files F3 and F4. Particularly, the process S7 is carried out, for example, at the end of each month or at a monthly-specified date. By performing this process S7, there are output a bill for advertisement charges toward a corresponding advertisement provider, and a payment statement for issued advertisements toward a corresponding store.

The bill and the payment statement are mailed to the corresponding advertisement provider and the store, and can be sent thereto through the Internet.

FIG. 9A is a diagram showing the record structure of the ad-issuing information file F3 according to advertisement, and FIG. 9B is a diagram showing the record structure of the ad-issuing information file F4 according to store.

The ad-issuing information file F3 is to store data items of "Advertisement ID", "Date (Year, Month, Date)", and "Number of Issued Receipts with Advertisement", according to record (advertisement/date). The ad-issuing information file F4 is to store data items of "Store ID", "Date (Year, Month, Date)", and "Number of Issued Receipts with Advertisement", according to record (store/date). The data item of "Number of Issued Receipts with Advertisement" in the ad-issuing information file F3 is to specify a calculated result of the number of issued receipts with advertisement, according to advertisement and date. The date item of "Number of Issued Receipts with Advertisement" in the ad-issuing information file F4 is to specify a calculated result of the number of issued receipts with advertisement, according to store and date.

The process S8 is a service process for daily providing the corresponding advertisement provider with the usage context of advertisements, i.e. print log information and a report of usage context, in the form of an email. During this process S8, a transmission-record reporting file F7 shown in FIG. 10A is created. At this time, the server computer 2 refers to an advertisement-provider master file M3 shown in FIG. 10B, and obtains an email address corresponding to a particular advertisement provider.

The transmission-record reporting file F7 is to store records each of which is composed of data items of "Date (Year, Month, Date)", "Advertisement ID", "Advertisement Name", "Advertisement-Provider Code", "Starting Date", "Number of Issued Receipts with Advertisement", "Total Number of Issued Receipts with Advertisement", "Maximum Number of Receipts with Advertisement", "Usage Rate", and "Warning Flag". The data item of "Total Number of Issued Receipts with Advertisement" is to specify the summed total number of issued receipts with advertisement according to advertisement/date. The data item of "Usage Rate" is to specify a value obtained by calculating (total number of issued receipts/maximum number of receipts to be issued*100). Further, the date item of "Warning Flag" is to specify a flag which is set when to suggest a corresponding advertisement provider to decrease the number of set advertisement providing conditions, if an advertisement is not often printed on receipts. For example, the advertisement may not be printed frequently, because set advertisement providing conditions corresponding to the advertisement are so many that only a very small number of customers correspond to the conditions.

The advertisement provider master file M3 includes records each of which is composed of data items of "Advertisement-Provider Code", "Advertisement-Provider Name", and "Email Address".

Figure 11:
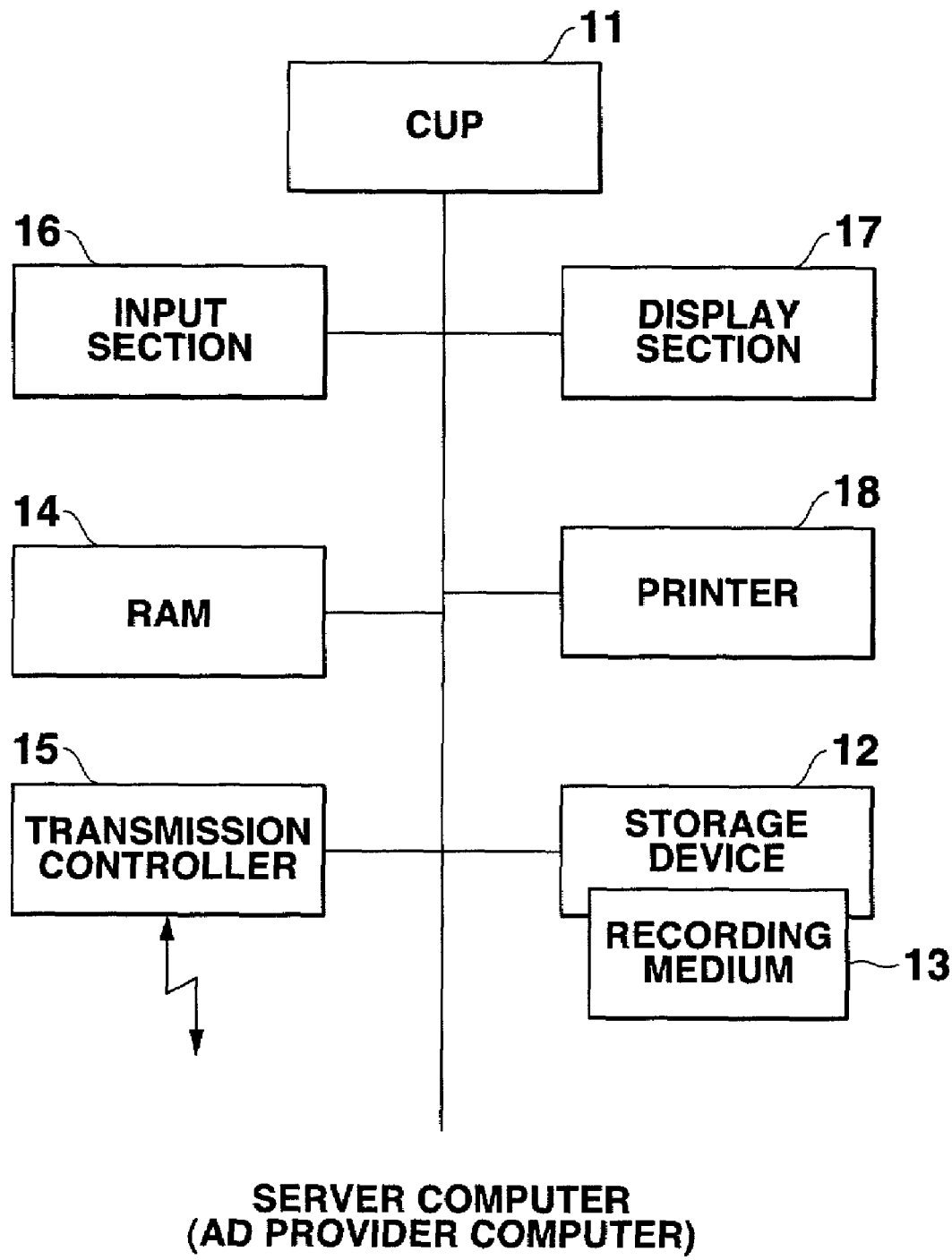
FIG. 11 is a block diagram showing the entire structure of the advertisement provider computer 1 and server computer 2.

FIG. 11 is a block diagram showing the entire structure of the advertisement-provider computer 1 and the server computer 2.

The advertisement-provider computer 1 and the server computer 2 have substantially the same structure. Hence, explanations will be made to the structure of the server computer 2.

A CPU 11 controls the entire processes of the server computer 2 in accordance with various application programs or the OS (Operating System) inside a storage device 12. The storage device 12 stores the OS, the various application programs, database, data regarding character fonts, etc. The storage device 12 has a recording medium 13 including a magnetic or optical semiconductor memory, and a driving mechanism thereof. This recording medium 13 is a portable medium including a CD-ROM, floppy disk, RAM card, magnetic card, etc. which can be fixed to or attached to/detached from the hard disk. The program, data stored on the recording medium 13 are loaded into a RAM (for example, static RAM) 14 under the control of the CPU 11 as needed, and the data stored in the RAM 14 is saved onto the recording medium 13. Further, the recording medium 13 may be arranged in an external device, such as a server, etc. In this case, the CPU 11 may directly access programs/data stored on the recording medium through a transmission path.

The CPU 11 acquires a part or the entire data stored on the recording medium 13 from any other device through the transmission path. The CPU 11 can also newly register additional information on the recording medium 13. In this case, programs/data sent from other device forming the computer communications system can be received, under the control of a transmission controller 15, through a wired path, including a communications circuit, cable, etc. or a radio transmission path, including micro-waves, infrared rays. The received programs/data can be installed onto the recording medium 13. Further, the programs/data may be stored in and managed by the external device. In this case, the CPU 11 can directly access the programs/data stored therein through a transmission path.

The transmission controller 15, an input section 16, a display section 17, and a printer 18 are connected to the CPU 11 through a bus line. The CPU 11 controls the operations of the connected sections in accordance with the various application programs and the OS. The transmission controller 15 is a communications interface including a communication module, such as a communications modem, infrared module, etc. The input section 16 is an operation section forming a pointing device, including a keyboard, touch panel, mouse, touch inputting pen, etc., and inputs character code data, various commands. The display section 17 is a LCD, CRT or plasma display device for performing full-color displaying. The printer 18 is a non-impact printer, or a dot-impact printer, including a thermal process printer, ink-jet printer, etc.

Figure 12:
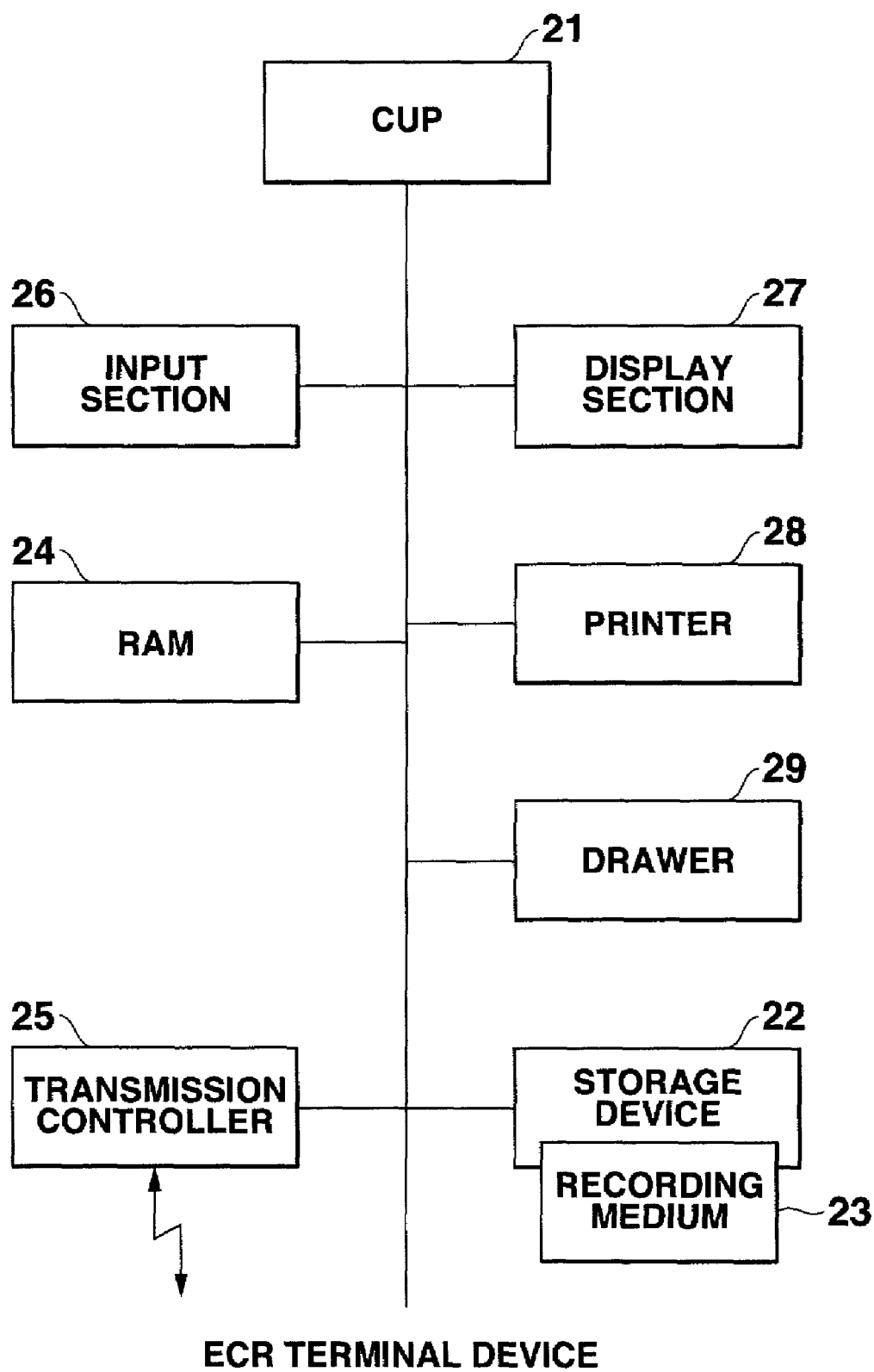
FIG. 12 is a block diagram showing the entire structure of each ECR terminal device 3.

FIG. 12 is a block diagram showing the entire structure of the ECR terminal device 3.

The ECR terminal device 3 comprises a CPU 21, a storage device 22, a recording medium 23, a RAM 24, a transmission controller 25, an input section 26, a display section 27, a printer 28, and a drawer 29. The input section 26 includes numerical keys, product keys, section keys, and a mode-switching key. This mode-switching key is to specify a particular mode, of various modes including "Register", "Check", "Settle", and "Set". When it is in "Register" mode, the CPU 21 registers input sales data into a total sales file according to goods (not illustrated), and prints the registered contents onto a receipt. Every time a registration process is completed after each business transaction, a closing process is executed, and a receipt with the registration data is issued. At this time, the advertisement data may be printed onto the receipt.

A line connection mechanism, such as a modem or the like, is installed into the ECR terminal device 3. In place of installing the line connection mechanism into the ECR terminal device 3, however, an external model may be employed.

Operations of Advertisement Data Management System

Explanations will now be made to operations of the advertisement-provider computer 1, server computer 2 and ECR terminal device 3 which forms the advertisement data management system according to the embodiment, with reference FIGS. 13 to 25. Programs for realizing the functions described in the flowcharts of FIGS. 13 to 25 are stored on the recording medium 12 (22) in the form of readable program codes. The CPU 11 (21) successively execute operations in accordance with the program codes which are transmitted through a transmission path and installed into the storage device 12 (22). The CPU 11 (21) may execute operations of this embodiment, with using the programs/data which are externally sent through the transmission path.

Process for Setting Advertisement Contents

Figure 13:
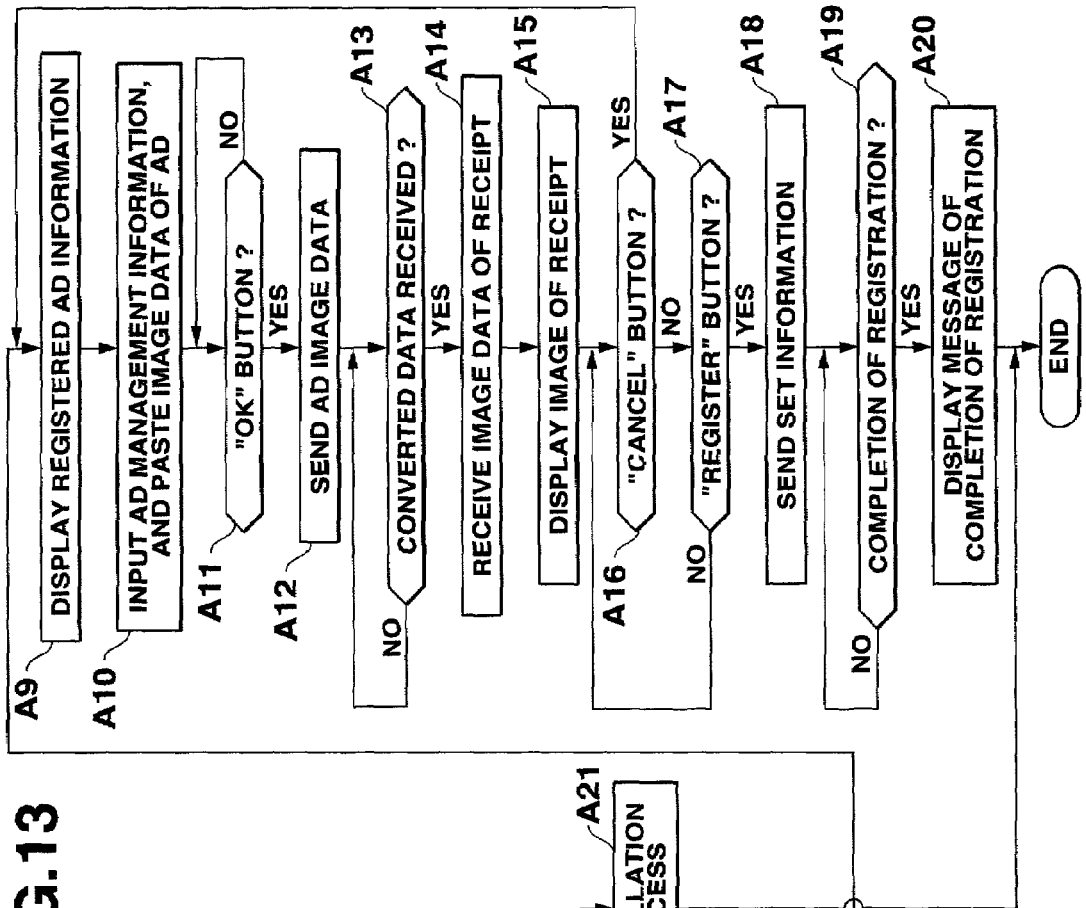
FIG. 13 is a flowchart for explaining a process for setting advertisement information which is carried out by the advertisement provider computer 1.
Figure 14:
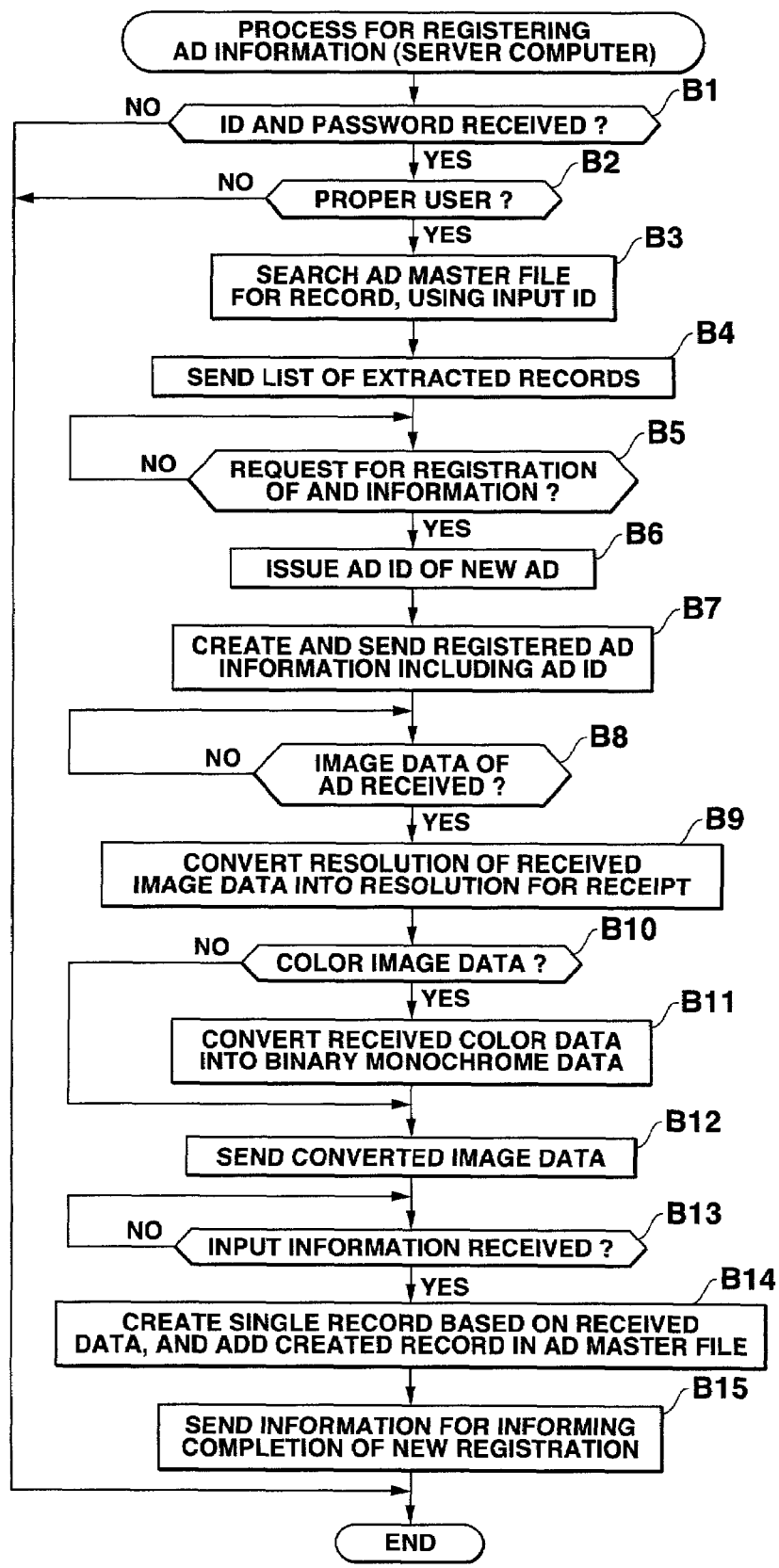
FIG. 14 is a flowchart for explaining a process for registering advertisement information which is carried out by the server computer 2.

FIG. 13 is a flowchart for explaining a process for setting advertisement information, which is carried out by the advertisement-provider computer 1, in the case where advertisement data or any various advertisement information related to the data are to be registered. FIG. 14 is a flowchart for explaining a process for registering advertisement information, which is carried out by the server computer 2.

The advertisement-provider computer 1 activates the Web browser, and connects to an advertisement service site through the Internet (Step A1, A2). On a membership verification page (written in HTML) which is sent from the advertisement service site, the advertisement-provider computer 1 inputs a membership ID and a password which are given from the advertisement service site when a contact therebetween has just been made. After the membership ID and the password are sent to the server computer 2, the advertisement-provider computer 1 waits for a response from the site (Step A3, A4).

Upon reception of the membership ID and the corresponding password from the advertisement-provider computer 1 (Step B1), the server computer 2 verifies a user of the advertisement-provider computer 1. If the user is verified and determined as a proper user (Step B2: Yes), the server computer 2 activates the process S1, and executes procedures of Steps B3 to B 5. The server computer 2 searches the advertisement master file M1 for a target provider code using the verified membership ID as a retrieval key, and extracts all records corresponding to the retrieval key (Step B3). Then, the server computer 2 creates a list of the extracted records, and sends the list to the advertisement-provider computer 1 having sent a request for the list (Step B4).

Upon reception of the created list from the server computer 2 (Step A4), the advertisement-provider computer 1 displays registered advertisements based on the list, and waits for the user inputting an instruction (Step A5).

FIG. 26 shows the list of the registered advertisements. In this case, the entire records of the advertisements, which have been registered by the advertisement provider in the past, are displayed. In the display screen of the records, data items of "Advertisement ID", "Title", "From (Date)", "Maximum Number of Receipts to be Issued with Advertisement", and "Total Number of Issued Receipts with Advertisement" are displayed. A "New" button is arranged in the display screen. When the "New" button is pressed (Step A6), a request for advertisement information registration is sent to the server computer 2 (A7, A8).

In the process S1, upon reception of the request for advertisement registration from the advertisement-provider computer 1 (Step B5), the server computer 2 issues an advertisement ID for identifying a new advertisement (Step B6). Then, the server computer 2 creates a page for registering advertisement information, which is written in HTML and includes the advertisement ID, and sends the created page to the advertisement-provider computer 1 having sent the request (Step B7).

Upon reception of the created page (Step A8), the advertisement-provider computer 1 creates a page layout of a dialog box for advertisement information registration based on the created page, and displays the dialog box. This enables the user to set any necessary advertisement information according to each data item in the displayed dialog box (Step A9). This dialog box of the advertisement information registration is displayed, not only when to newly register advertisement information, but also when to correct the data contents of the already-registered advertisement information.

FIG. 27 shows the dialog box of the advertisement information registration. In this dialog box, there are set a plurality of boxes corresponding to data items of "Advertisement ID", which is automatically set, "Title", "From (Date)", "Maximum Number of Receipts to be Issued with Advertisement", "Target Age Group", . . . "Time Code". In the dialog box, there is a box into which an advertisement image is affixed. Thus, the operator of the advertisement-provider computer 1 inputs required advertisement information in the set boxes corresponding to the respective data items, and affixes the advertisement data into the corresponding box.

For advertisement attributes to be input as advertisement providing conditions including as the data item of "Target Age Group", etc., menus each of which is formed by a plurality of parameters are displayed. Through those menus, the operator of the advertisement-provider computer 1 selects an arbitrary item parameter of the plurality of displayed parameters. After the inputting of the information corresponding to the attribute items, the operator calls predetermined advertisement image data from a storage file (not illustrated) for storing pre-created advertisement image data, and copies the predetermined image data so as to past the data into a predetermined frame (Step A10).

Figure 28:
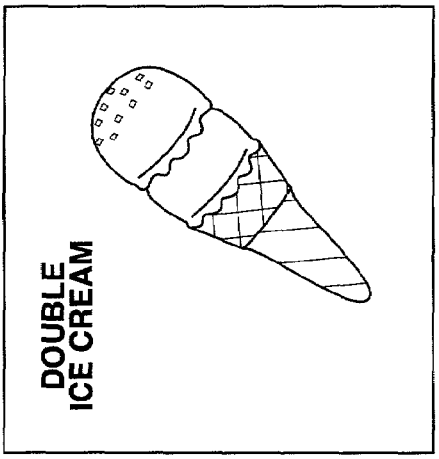
FIG. 28 is a diagram showing a state wherein advertisement data is pasted in a predetermined frame in the registration display.

FIG. 28 shows the state wherein the data of the advertisement attribute items and the advertisement image data are arranged in their corresponding frames in the display of the advertisement information registration. In the display screen, when an "OK" button is clicked on (Step S11), the advertisement-provider computer 1 sends the pasted image data to the server computer 2 (Step A12).

Upon reception of the advertisement image data, the server computer 2 converts the resolution (number of pixels in length and width) of the image data into the resolution conforming to the size of receipts (Step B9). In the case where the received is color image data (Step B10: Yes), the server computer 2 converts the received color image data into binary monochrome data (Step B11). In this case, a dithering is processed to halftone colors. The advertisement image data whose resolution has been converted is sent to the advertisement-provider computer 1 having sent the original image (Step B12).

Upon reception of the advertisement data from the server computer 2 (Step A13, A14), the advertisement-provider computer 1 displays this received image in the predetermined frame in the dialog box of the advertisement information registration (Step A15).

Figure 29:
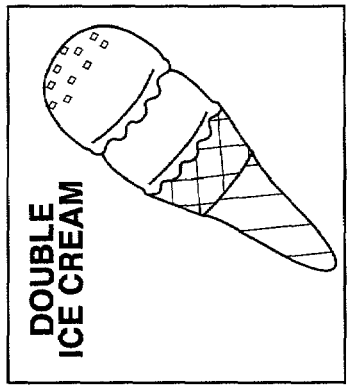
FIG. 29 is a diagram showing the pasted advertisement data which has been converted into a corresponding image for receipt printing in the registration display.

FIG. 29 shows such a dialog box of the advertisement information registration. The advertisement data in the predetermined frame is rewritten in an image corresponding to a format of receipt-printing.

It is determined whether either button of "Cancel" and "Register" is clicked on. When determined that the button of "Cancel" is pressed (Step A16: Yes), the flow returns to the procedure of Step A9, and the inputting is performed again. When determined that the button of "Register" is pressed (Step A17: Yes), the advertisement-provider computer 1 sends the data contents of each box in the dialog box of the advertisement information registration to the server computer 2 (Step A18).

Upon reception of the input data contents from the advertisement-provider computer 1 (Step B13), the server computer 2 newly creates and adds the record in the advertisement master file M1 based on the received data (Step B14). Then, the server computer 2 sends information for informing the advertisement-provider computer 1 of the completion of the advertisement information registration (Step B15).

After receiving the information from the server computer 2, the advertisement-provider computer 1 displays a message representing the completion of the registration (Step A19, A20). The operator of the advertisement-provider computer 1 can be aware that the advertisement information including the advertisement image data is appropriately registered in the server computer 2.

Accordingly, the advertisement provider having made a contract with the advertisement service provider accesses the server computer 2. In this structure, the advertisement provider can freely register any desired images and advertisement management information related to the image any time he/she wants.

Store Information Registration Process

The server computer carries out the process S2 for registering store attributes of each store as advertisement user conditions, so as to register the store attributes in the store master M2. In this case, registration forms including store attribute items are distributed to stores in advance. The registration forms which are filled in are collected from stores intending to use advertisements via mail or facsimile. Attribute information written in the collected registration forms are manually input by a system administrator or operator in a dialog box (not illustrated) for store information registration. The dialog box for store information registration is displayed in accordance with the process S2. The store attribute information is registered in the store master file M2 as advertisement user conditions, according to each store. This store registration process is carried out for each store intending to perform new registration.

Advertisement Extraction Process

Figure 15:
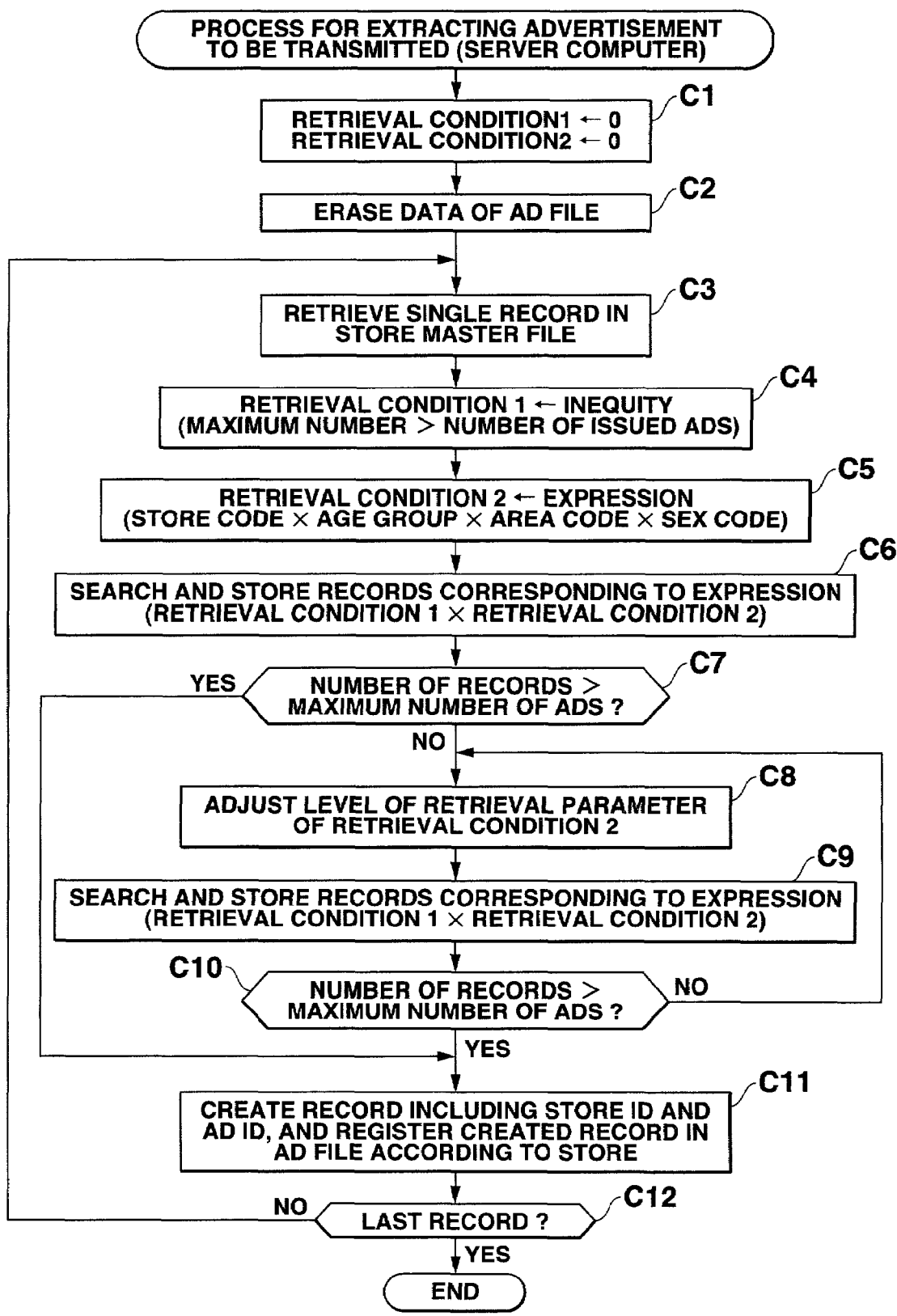
FIG. 15 is a flowchart for explaining a process for extracting a target advertisement to be transmitted.

FIG. 15 is a flowchart for explaining the process S3 for selecting an advertisement to be transmitted the day after the execution of this process S3. The server computer 2 refers to the data contents of the advertisement master file M1 and the store master file M2. The server computer 2 then carries out a process for selecting advertisement data corresponding each store registered in the store master file M2. This process is executed when the process S3 is activated at a specified time after the opening hours of each corresponding store registered in the store master file M2.

The server computer 2 initializes a work memory M1 (not illustrated) for setting a retrieval condition 1 and a work memory M2 (not illustrated) for setting a retrieval condition 2, in the RAM 14, and performs a process for erasing the data contents of the entire records in the advertisement file F1 (Step C1, C2).

The server computer 2 retrieves one record from the store master file M2 (Step C3). In this case, the server computer 2 obtains the head record of the store master file M2.

Then, an inequity ("Maximum Number of Receipts to be Issued with Advertisement">"Total Number of Issued Receipts with Advertisement") for searching the advertisement master file M1 based on the retrieval condition 1 is set in the work memory M1 (Step C4). This inequity based on the retrieval condition 1 is prepared for determining whether to exclude an advertisement(s), of advertisements to be provided to contracted stores. Whether a particular advertisement is to be excluded is determined, in the case where the "Total Number of Issued Receipts with Advertisement" exceeds the "Maximum Number of Receipts to be Issued with Advertisement" since corresponding advertisement management information was registered in the advertisement master file M1.

As retrieval parameters, store attribute information, which are registered in association with each of the data items of "Store Code", "Age Group Code", "Area Code", and "Sex Code", are extracted from each corresponding record of the store master file M2. An equation wherein the extracted parameters are ANDed is set in the work memory 2 (Step C5).

Using another retrieval condition 3 which is a result of an AND operation of the retrieval conditions 1 and 2 which are set in the respective work memories M1 and M2, the server computer 2 searches the advertisement master file M1 for any advertisement information record(s) corresponding to the retrieval condition 3, and temporarily stores the corresponding record(s) in a work memory 3 (not illustrated) (Step C6). After this, the server computer 2 counts the number of records stored in the work memory 3. The server computer 2 compares the number of the records with the value of "Maximum Number of Advertisement Data Items" registered in the store attribute record of the store master file M2. Then, the server computer 2 determines whether the number of the records is equal to or larger than the value of "Maximum Number of Advertisement Data Items" (Step C7).

The value of "Maximum Number of Advertisement Data Items" is the largest number of items of advertisement data which the internal memory of the ECR terminal device 3 can store. In the case where the number of extracted records is larger than the value of "Maximum Number of Advertisement Data Items", data of "Store ID" and data of "Advertisement ID" are sequentially retrieved from the respective store attribute record and the advertisement information record. A number of records, each of which is composed of the data of "Store ID" and data of "Advertisement ID", which is the same as the number of the extracted records, are created. The created records are sequentially registered in the advertisement file F1 (Step C11).

Alternatively, if the number of extracted records is smaller than the value of "Maximum Number of Advertisement Data Items", a level of the retrieval condition 2 is set higher, so that a retrieval range in the advertisement master file M2 is widened. Then, the server computer 2 searches the advertisement master file M1 again, and repeats adjusting the level of the retrieval parameter, until the number of extracted records becomes equal to or larger than the value of "Maximum Number of Advertisement Data Items" (Steps C8 to C10).

Particularly, the level of the retrieval condition 2 is set higher by one (Step C8). In this case, of the data items of "Store ID", "Age Group", "Area Code", and "Sex Code", the level of the retrieval condition of "Area Code" is automatically lowered by one level. For example, when TOKYO is specified in the data item of "Area Code", the server computer 2 searches an area-code retrieval table (not illustrated) for any corresponding store records, using the specified area code as a retrieval key. The area-code retrieval table stores area codes of Japan, for example, which are divided into four retrieval levels, 0 to 3. Note, in the first level, level 0, the entire country of Japan is divided into two large areas, for example. In the second level, level 1, each of the two large areas is subdivided into a plurality of blocks. In the third level, level 2, each of the plurality of blocks is divided into regions. In the fourth level, level 3, each region is further divided into smaller areas. When the area code is specified as TOKYO, which is in the level 3, a region in an upper level of TOKYO is obtained, e.g. a region of KANTO. Thereafter, the area code of TOKYO in the data item "Area Code" is rewritten into KANTO.

Using the retrieval equation of "Condition 1 AND Condition 2", the server computer 2 searches the advertisement master file M1 for corresponding advertisement information records, and temporarily stores the searched records in the internal memory (Step C9). The server computer 2 counts the number of advertisement information records stored in the internal memory, and determined whether the counted value is equal to or larger than the value of "Maximum Number of Advertisement Data Items" (Step C10).

When determined that the counted value is smaller than the value of "Maximum Number of Advertisement Data Items" (Step C10: No), the flow returns to the step C8. In the step C8, the server computer 2 refers to an age-retrieval table (not illustrated), and sets the level of "Age Group", i.e. the retrieval condition 2, higher by one. For example, in the case where TEENAGERS are specified in the "Age Group", an age group in an upper level than the level of TEENAGERS is obtained, i.e. 20's. After this, the age group of TEENAGERS in the data item of "Age Group" is rewritten into 20's, so that the server computer 2 searches the advertisement master file M1 for any corresponding records based on the rewritten condition of "Condition 1 AND Condition 2" (Step C9).

Similarly, with reference to a sex-code retrieval table (not illustrated) and a store-code retrieval table (not illustrated), the server computer 2 sets the retrieval levels of the sex code and store code higher by one level, until the number of extracted records becomes equal to or larger than the value of "Maximum Number of Advertisement Data Items". When the number of extracted records becomes equal to or larger than the value of "Maximum Number of Advertisement Data Items" (Step C10: Yes), the server computer 2 sequentially creates a record, which is composed of "Store ID" of each corresponding store record and "Advertisement ID" of each corresponding advertisement record. Then, the server computer 2 stores the created record in the advertisement file F1 (Step C11).

After this, the server computer 2 determines whether the currently-referred store record is the last record in the store master file M2 (Step C12). If determined that the currently-referred store record is the head record of the store master file M2 (Step C12: No), the flow return to the step C3. Then, the server computer 2 refers to the next store record, and repeats the above-described procedures for each store record.

When to set the levels of the retrieval conditions higher by one level, the setting is performed in order sequentially from "Area Code", "Age Group", "Sex Code", to "Store Code". However, the setting may be accomplished in any order other than the above.

Advertisement Selection Process

Figure 16:
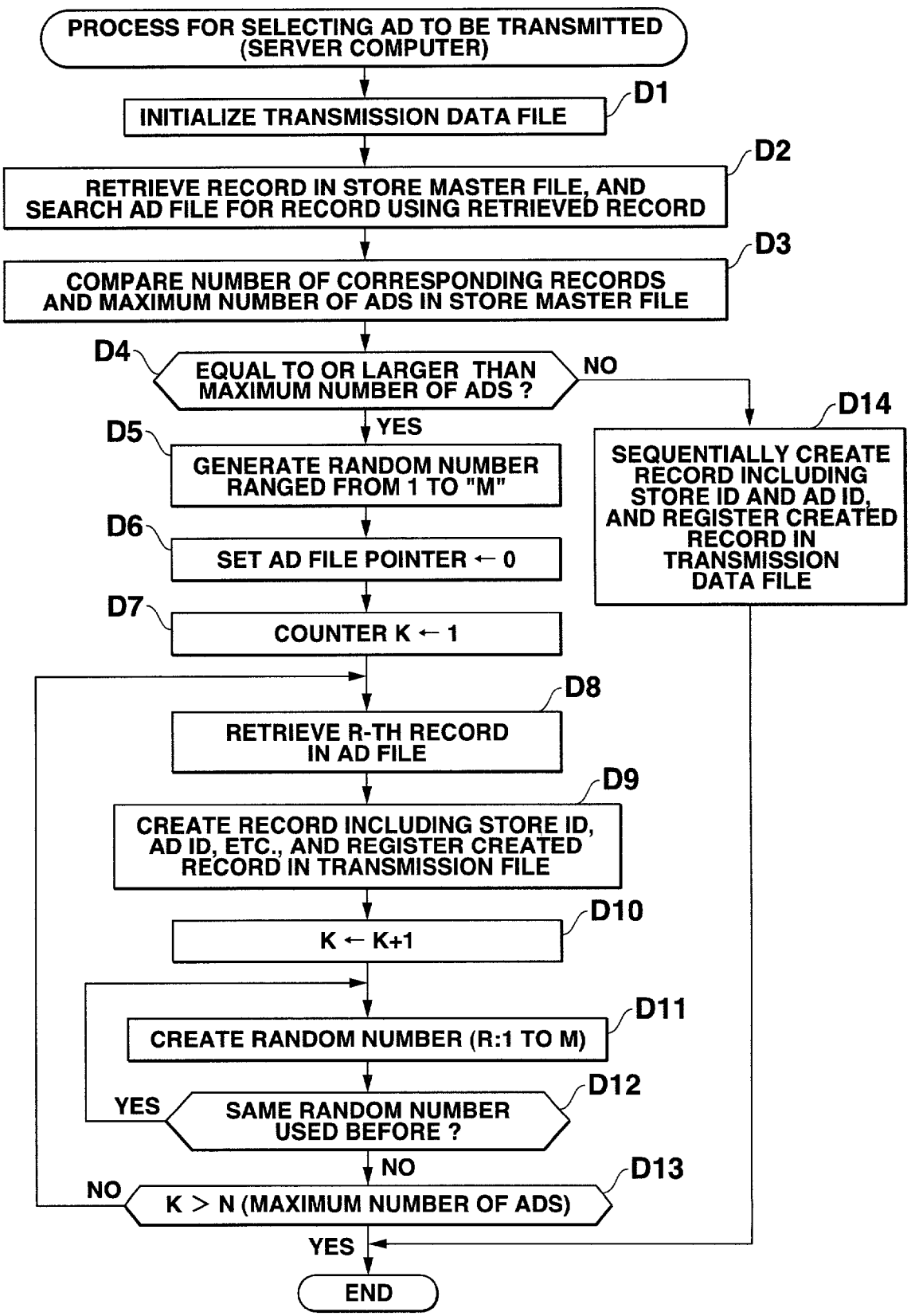
FIG. 16 is a flowchart for explaining a process for selecting a target advertisement to be transmitted, which is carried out following the process for extracting a target advertisement.

FIG. 16 is a flowchart for explaining the process S4 which is executed following the above-described process S3. In the process 4, the server computer 2 carries out a process for preparing transmission of advertisements extracted in the process S3. During this process, if the number of extracted advertisements is equal to or larger than the value of "Maximum Number of Advertisement Data Items", the number of extracted advertisements is limited to the value of "Maximum Number of Advertisement Data Items".

The server computer 2 initializes the transmission data file F2 (Step D1). The server computer 2 retrieves one record from the store master file M2, obtains a store ID of the retrieved record. Then, the server computer 2 searches the advertisement file F1 for a corresponding advertisement record using the obtained store ID as a retrieval key, and temporarily stores the searched record in the internal memory (Step D2).

The server computer 2 counts the number of advertisement records which have been searched and stored accordingly. The server computer 2 compares the counted value with the value of "Maximum Number of Advertisement Data Items" in the corresponding record of the store master file M2 (Step D3).

If the counted value is smaller than the value of "Maximum Number of Advertisement Data Items" which can be stored in the ECR terminal device 3 of its corresponding store (Step D4: No), the flow advances to Step D14. In the step D14, the server computer 2 specifies the searched advertisements as target advertisements to be transmitted, and writes the advertisements in the transmission data file F2. That is, the server computer 2 reads out each record in the advertisement file F1, searches the advertisement master file M2 based on the advertisement ID of the read record. Then, the server computer 2 extracts data items of "URL of Advertisement Data", "Time Code", "Sex Code", and "Age Group", for each record corresponding to the advertisement ID. The server computer 2 creates records each of which is composed of the extracted data items and the data items of "Store ID", and "Advertisement ID" extracted from the records in the advertisement file F1. Thereafter, the server computer 2 repeats the process for preparing transmission of advertisement to be registered in the transmission file F2, for a number of times which is equal to the number of records stored in the advertisement file.

If the counted value is equal to or larger than the value of "Maximum Number of Advertisement Data Items" (Step D4: Yes), the number is limited to ten, for example, when the maximum number of items of advertisement data is ten. At this time, the first ten items of data are taken, and the rest of the items of data are ignored. In this case, only the limited number of advertisements are used, and the ignored items of data are not used. To use the selected advertisements equally, the following process is carried out.

The server computer 2 generates a random number R (integer) in a range from 1 to "m" (the number of selected records) (Step D5). The server computer 2 sets the generated random number R as an advertisement file pointer R according to store (Step D6). Then, the server computer 2 sets an initial value "1" in a counter K (Step D7).

In this state, the server computer 2 retrieves an "R-th" record in the advertisement file F1 using a particular pointer R specifying the "R-th" record (Step D8). The server computer 2 searches the advertisement master file M1 based on an advertisement ID of the record, and extracts data items of "URL of Advertisement Data", "Time Code", "Sex Code", and "Age Group" of the corresponding record. At the same time, the server computer 2 registers the extracted data items and a record, which is composed of "Store ID" and "Advertisement ID", in the transmission data file F2 (Step D9).

Subsequently, the server computer 2 adds "1" to the value of the counter K so as to update the counter value (Step D19), and generates a new random number R (Step D11). The server computer 2 determines whether the new random number R has been used before (Step D12). In this case, the server computer 2 stores the random number R which has been used in this selection process, refers to the stored data, and determines whether the random number R has been used before. When determined that the random number has been used before (Step D12: Yes), the flow returns to Step D11, wherein another random number is repeatedly generated. On the other hand, when determined that the random number has not been used before (Step D12: No), the server computer 2 further determines whether the value of the counter K exceeds the value of "n" (the maximum number of items of advertisement data), i.e. whether the number of records corresponding to the "Maximum Number of Advertisement Data Items" are completely written in the transmission data file F2 (Step D13). When determined that the "Maximum" number of records are not yet written in the transmission data file F2 (Step D13: No), the flow returns to the step D8, and the following procedures are repeated.

Accordingly, the number of records which corresponds to the "Maximum Number of Advertisement Data Items" are stored in the transmission data file F2, based on the randomly-extracted records.

Advertisement Transmission Process

In the process S4, as carried out by the server computer 2, the predetermined number of items of advertisement data which can be transmitted to each contracted store are stored in the transmission data file F2. In this structure, each contracted store accesses the advertisement service site, and sends a request for advertisement transmission so as to use the advertisement data directed to the store any time he/she wants. In this case, the server computer 2 carries out the process S5 for facilitating the transmission of the advertisement data between the server computer 2 with the ECR terminal device 3.

Figure 17:
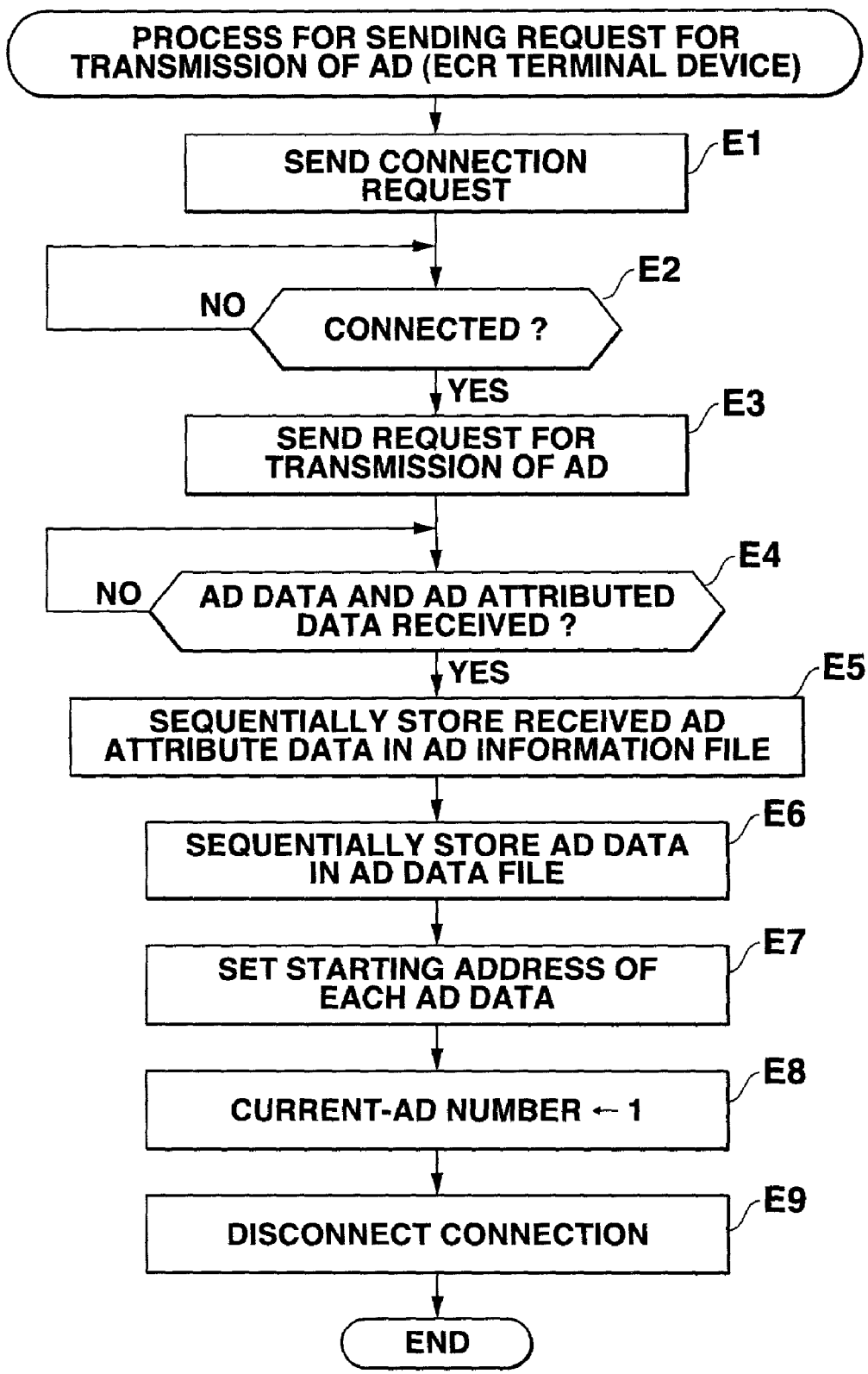
FIG. 17 is a flowchart for explaining a process for sending a request for transmission of an advertisement, which is carried out by the ECR terminal device 3.
Figure 18:
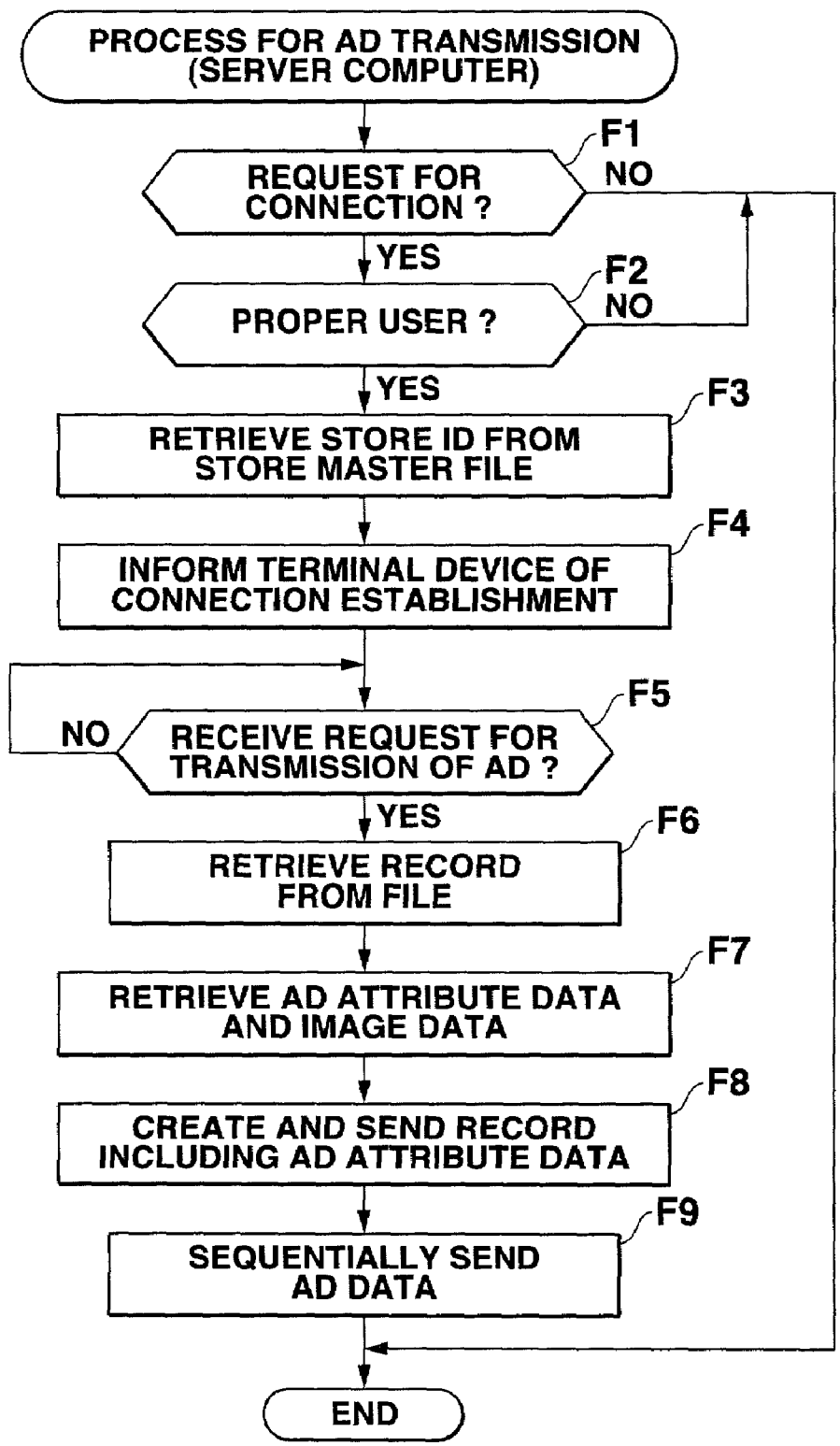
FIG. 18 is a flowchart for explaining a process for transmitting advertisement, which is carried out by the server computer 2 in response to a request from the ECR terminal device 3.

FIG. 17 is a flowchart for explaining a process for sending a request for transmission of advertisements to the advertisement service site, as will be carried out by the ECR terminal device. FIG. 18 is a flowchart for explaining the process S5, which is executed by the server computer 2 in response to a request for advertisement transmission from the ECR terminal device 3. The process for sending a request for advertisement transmission is performed, in response to an input instruction or at a scheduled time.

In this process for sending a request for advertisement transmission, the ECR terminal device 3 sends a connection request to the server computer 2 through the Internet (Step E1). When the connection is made between the server computer 2 with the ECR terminal device 3 (Step E2), the ECR terminal device 3 sends a request for advertisement transmission thereto, and waits for a response from the server computer 2 (Steps E3, E4).

Upon reception of a connection request from the ECR terminal (Step F1), the server computer 2 executes a verification procedure in accordance with the request. When the sender of the connection request is verified as a proper contracted store (Step F2: Yes), the server computer 2 obtains a corresponding store ID from the store master file M2, using, as a key, an IP address of the ECR terminal device 3 which has been sent therefrom together with the connection request (Step F3). After this, the server computer 2 makes a communications connection with the ECR terminal device 3, and informs the ECR terminal device 3 of the establishment of the connection (Step F4).

Upon reception of the request for advertisement transmission from the ECR terminal device 3 which has been informed of the establishment of the connection, the server computer 2 activates the process S5 (Step F5). Then, the server computer 2 searches the transmission data file F2, using the obtained store ID as a key, and retrieves a corresponding record from the file (Step F6). The server computer 2 accesses the database 4, based on a URL described in the data item of "URL of Advertisement Data" within the record retrieved from the transmission data file F2, and retrieves corresponding advertisement data. At the same time, the server computer 2 obtains the number of bytes of the retrieved advertisement data (Step F7). After this, the server computer 2 transmits the item information and the information regarding the number of bytes in an FTP format to the ECR terminal device 3 (Step F8). After the server computer 2 sends the item information to the ECR terminal device 3 having sent the request for advertisement transmission, the server computer 2 affixes an Advertisement ID to each advertisement data corresponding to each URL shown in the transmitted record, and sends the advertisement data in an FTP format (Step F9). In this case, the server computer 2 sends the "Maximum Number" of the advertisement data, which number is set in advance, to the ECR terminal device 3.

Upon reception of the item information and the advertisement data, for the "Maximum Number of Advertisement Data Items", from the server computer 2 (Step E4), the ECR terminal device 3 stores the item information in the advertisement information file F5 sequentially in order of advertisement ID. Every time the item information is stored in the advertisement information file F5 for each advertisement ID, the ECR terminal device 3 increments the total number of advertisements by one in the item of file header (Step E5).

The ECR terminal device 3 stores the "Maximum Number" of advertisement data items, to each of which a corresponding advertisement ID is affixed, in the transmission-record reporting file F7. At the same time, ECR terminal device 3 sets the head address of a storage area for each data piece as the starting address in the advertisement information file F5 (Step E7). Then, the ECR terminal device 3 sets the current-advertisement number in the header section of the advertisement information file F5 to 1 (Step E8). The ECR terminal device 3 disconnects the connection with the server computer 2 (Step E9).

Receipt Issuing Process

In daily business-transaction, every time a registration process for each business transaction is completed, the ECR terminal device 3 prints a receipt showing calculations by execution of a process for calculating the subtotal, tax, change, etc. After this, the receipt with the printed calculation and advertisement is issued by execution of the process E2. Explanations will now be made to the calculation process and the issuing process E2.

Figure 19:
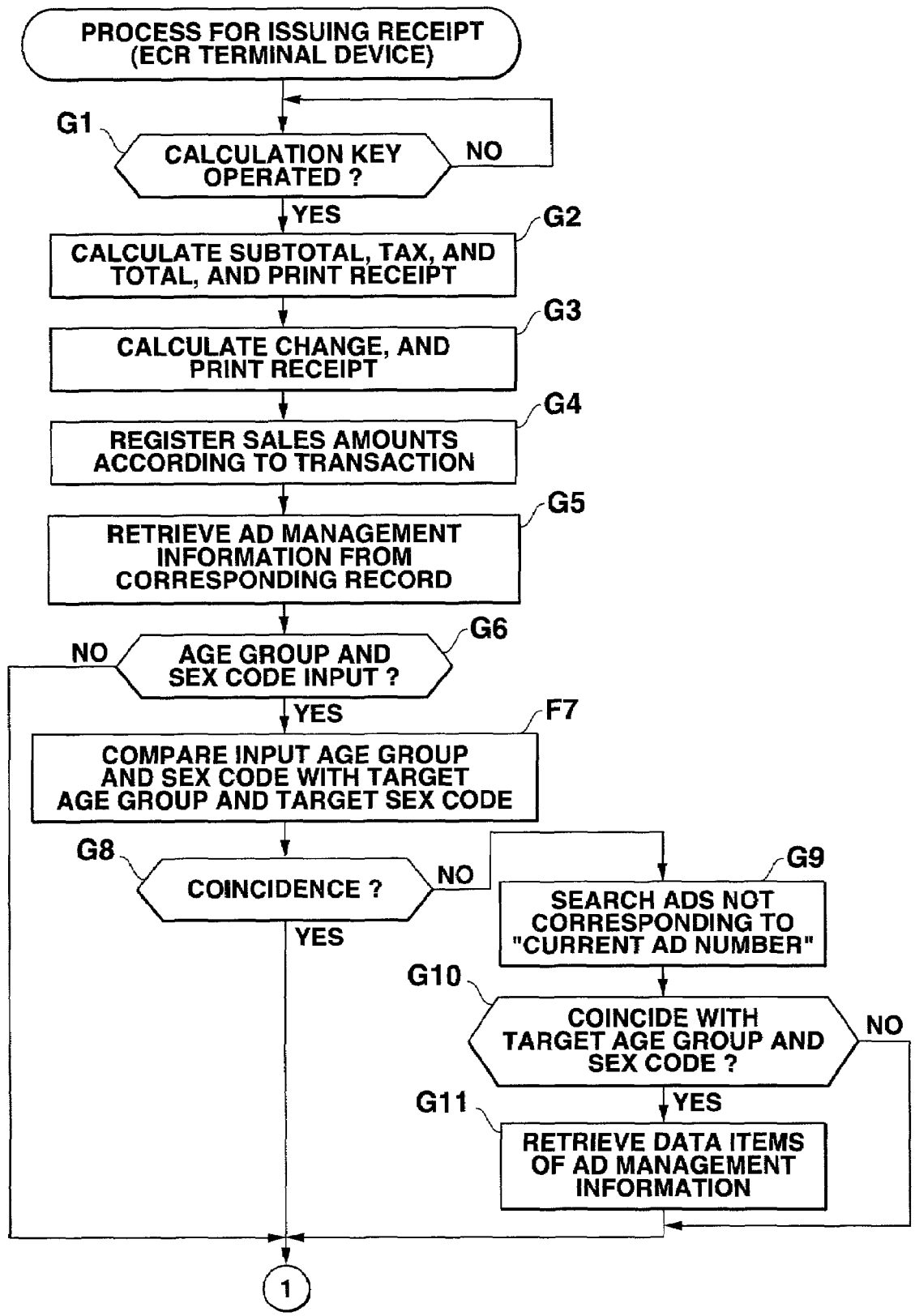
FIG. 19 is a flowchart for explaining a process for issuing receipts, which begins to be carried out when a calculation key is operated.
Figure 20:
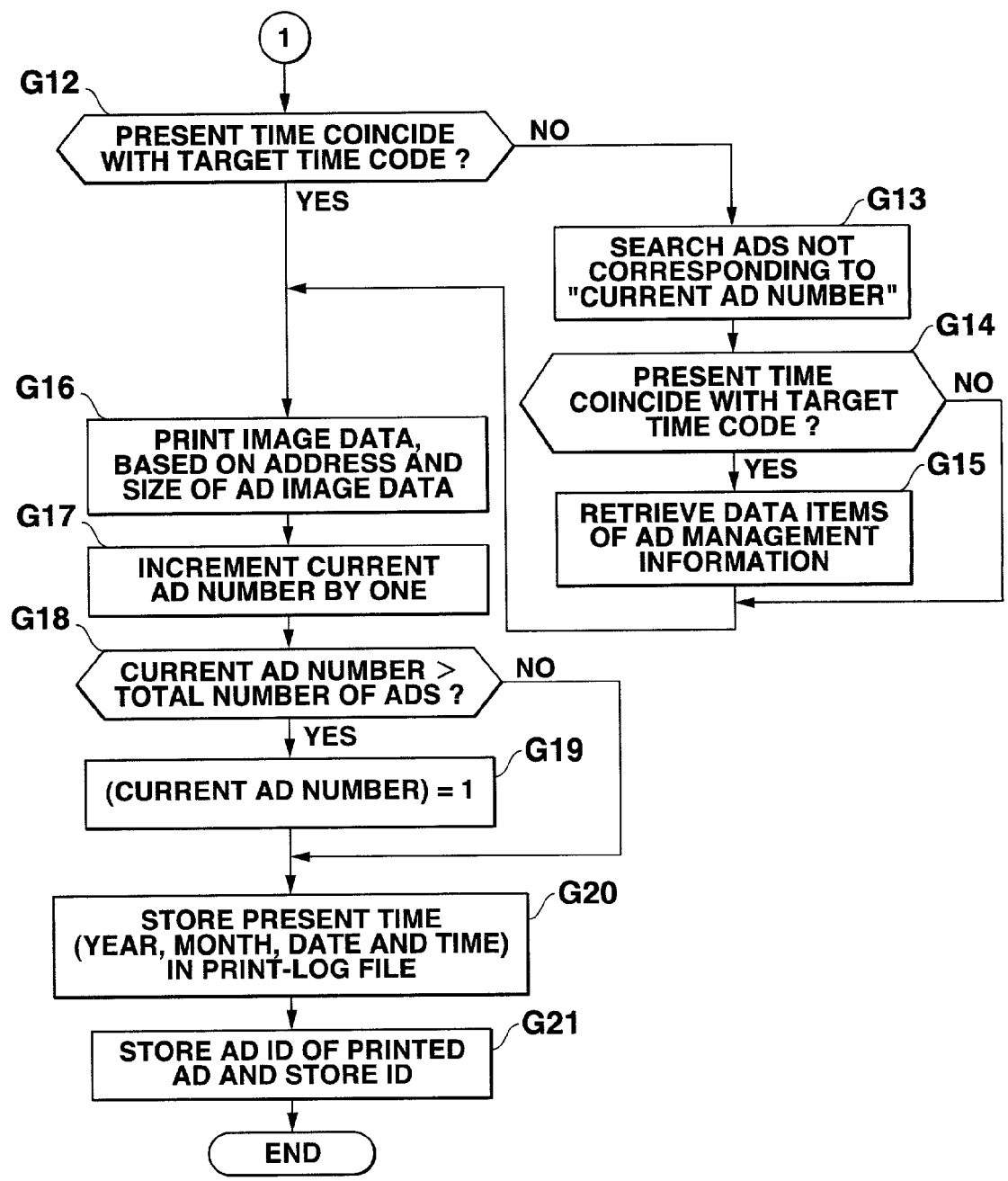
FIG. 20 is a flowchart for explaining a process for issuing receipts, which is carried out following the execution of the process of FIG. 19.

FIG. 19 is a flowchart for explaining the calculation process, which is carried out when the operator of the ECR terminal device 3 operates a particular calculation key, such as a "CASH" key, "CREDIT" key, or the like. FIG. 20 is a flowchart for explaining the process E2 for printing an advertisement on a receipt and issuing the printed receipt. As shown in FIG. 7, pre-set header information is printed on a receipt by the execution of a process E4, for registering a business-transaction. The registered contents are printed on the receipt, in association with each sales data.

When a particular calculation key is operated after the registration of each business transaction (Step Gi), the calculation process begins. The ECR terminal device 3 calculates the subtotal, and obtains a sales tax based on the subtotal so as to calculates the total amount, whereby the total amount is printed on the receipt (Step G2). The operator of the ECR terminal device 3 inputs the amount of money the customer gave to the operator, calculates the change, and prints the amount of money and change on the receipt (Step G3). This registration of the business transaction is added and stored in a sales-amount memory according to each business transaction (not illustrated) (Step G4). Accordingly, the calculations are performed in the procedures of the steps G1 to G4.

Upon completion of the calculation procedures, the flow advances to Step G5, wherein a process for issuing a receipt beings. In the step G5, the ECR terminal device 3 reads out the current-advertisement number from the header of the advertisement information file F5. In addition, the ECR terminal device 3 obtains advertisement management information corresponding to read advertisement number from the advertisement information file F5 (Step G5). Note that an initial value "1" is set in the data item of "Current-Advertisement Number" in the file F5, immediately after transmission of advertisement data piece. Hence, the ECR terminal device 3 reads out the advertisement management information of the head record from the file F5.

Unless the operator inputs data of "Age Group" and "Sex Code" after the registration of each business transaction (Step G6: No), the flow advances to Step G12. In the step G12, the ECR terminal device 3 extracts the "Target Time Code" from the advertisement management information, and determines whether the present time coincides with the extracted time code.

When determined that the present time coincides with the "Target Time Code" (Step G12: Yes), the ECR terminal device 3 extracts the "Start Address of Advertisement Data" and the "Number of Bytes of Advertisement Data" from the advertisement management information. Then, the ECR terminal device 3 retrieves advertisement data from the transmission-record reporting file F7, and prints the retrieved advertisement data on the receipt in a manner corresponding to size of the receipt (Step G16). In this case, as illustrated in FIG. 7, the advertisement data is printed in a corresponding frame which is a predetermined distance away from the specification section (regularly-printed registration data). The width of the frame is a fixed value, however, the length thereof depends on each advertisement.

Now, the flow advances to Step G17, wherein the ECR terminal device 3 increments the "Current-Advertisement Number" by one. In the case where the "Current-Advertisement Number">"Total Number of Advertisement Data Items" (Step G18: Yes), the ECR terminal device 3 initializes the "Current-Advertisement Number" to 1 (Step G19). On the other hand, if the "Current-Advertisement Number"<"Total Number of Advertisement Data Items" (Step G18: No), the flow advance to Step G20.

After the printing of advertisement is thus performed, the ECR terminal device 3 records the print log in the file F6 (Steps G20, G21).

The ECR terminal device 3 obtains the present time and date, stores the obtained information in association with the data items of "Time (Year, Month, Date)" and "Printing Time" (Step G20). After this, the ECR terminal device 3 stores the advertisement ID and the store ID for designating the currently-printed advertisement data in the file F6 in association with each other (Step G21). Accordingly, in the file F6, one log record which is composed of data items of "Date (Year, Month, Date)", "Printing Time", "Advertisement ID", and "Store ID" is registered.

At the registration of one business transaction, if the operator of the ECR terminal device 3 inputs the "Age Group" and "Sex Code" of the customer (Step G6: Yes), the ECR terminal device 3 compares the input "Age Group" and "Sex Code" of the customer with the "Target Age Group" and "Target Sex Code" in the advertisement management information corresponding to the "Current-Advertisement Number" (Step G7). When both of the data items coincide with the target age group and the target sex information (Step G8: Yes), the ECR terminal device 3 specifies the advertisement management information to be printed, and the flow advances to step G12. On the other hand, both of the data items do not coincide with the compared data items (Step G8: No), the ECR terminal device 3 searches the file F5 for advertisement management information corresponding any advertisement numbers other than the current advertisement number (Step G9). If the ECR terminal device 3 finds advertisement management information including the "Target Age Group" and "Target Sex Code" which correspond to the input "Age Group" and "Sex Code" (Step G10: Yes), it retrieves one piece of the advertisement management information so as to print the information (Step G11). If there is no corresponding advertisement management information (Step G10: No), the ECR terminal device 3 specifies the advertisement management information corresponding to the "Current-Advertisement Number" as information to be printed, and the flow advances to the step G12.

As a result of the comparison of the "Target Time Code" included in the advertisement management information and the present time, if the present time does not coincide with the target time (Step G12: No), the ECR terminal device 3 searches the file F5 for any advertisement management information corresponding any advertisement numbers other than the current-advertisement number (Step G13). Then, the ECR terminal device 3 extracts a target time code included in the searched advertisement management information, and compares the extracted time code with the present time (Step G14). After this, if the present time coincides with a certain target time code, the ECR terminal device 3 retrieves one item of advertisement management information so as to print the information (Step G15).

If there is no corresponding target time code to the present time (Step G14: No), the ECR terminal device 3 specifies the advertisement data of the advertisement management information corresponding to the current-advertisement number as information to be printed, and the flow advances to Step G16.

Accordingly, the advertisement image data are printed on receipts sequentially on a first-come-first-stored basis. In the case where the "Age Group" and "Sex Code" of customers are input by the operator of the ECR terminal device, the advertisement image data corresponding to the input data is given priority in receipt printing. In the case where the present time coincides with the "Target Time Code", the advertisement image data corresponding to the input time is given priority in receipt printing. Every time an advertisement is printed on a receipt, the "Current-Advertisement Number" in the header of the file F5 is updated. In addition, the advertisement corresponding to the "Current-Advertisement Number" is specified as one to be printed, and the advertisement is recorded as being used at this time.

Print-Log Sending Process and Print-Log Calculation Process

After the business hours, the ECR terminal device 3 carries out the process E3 for automatically sending the data contents of the file F6 to the server computer 2, at a specified time once a day.

Figure 21:
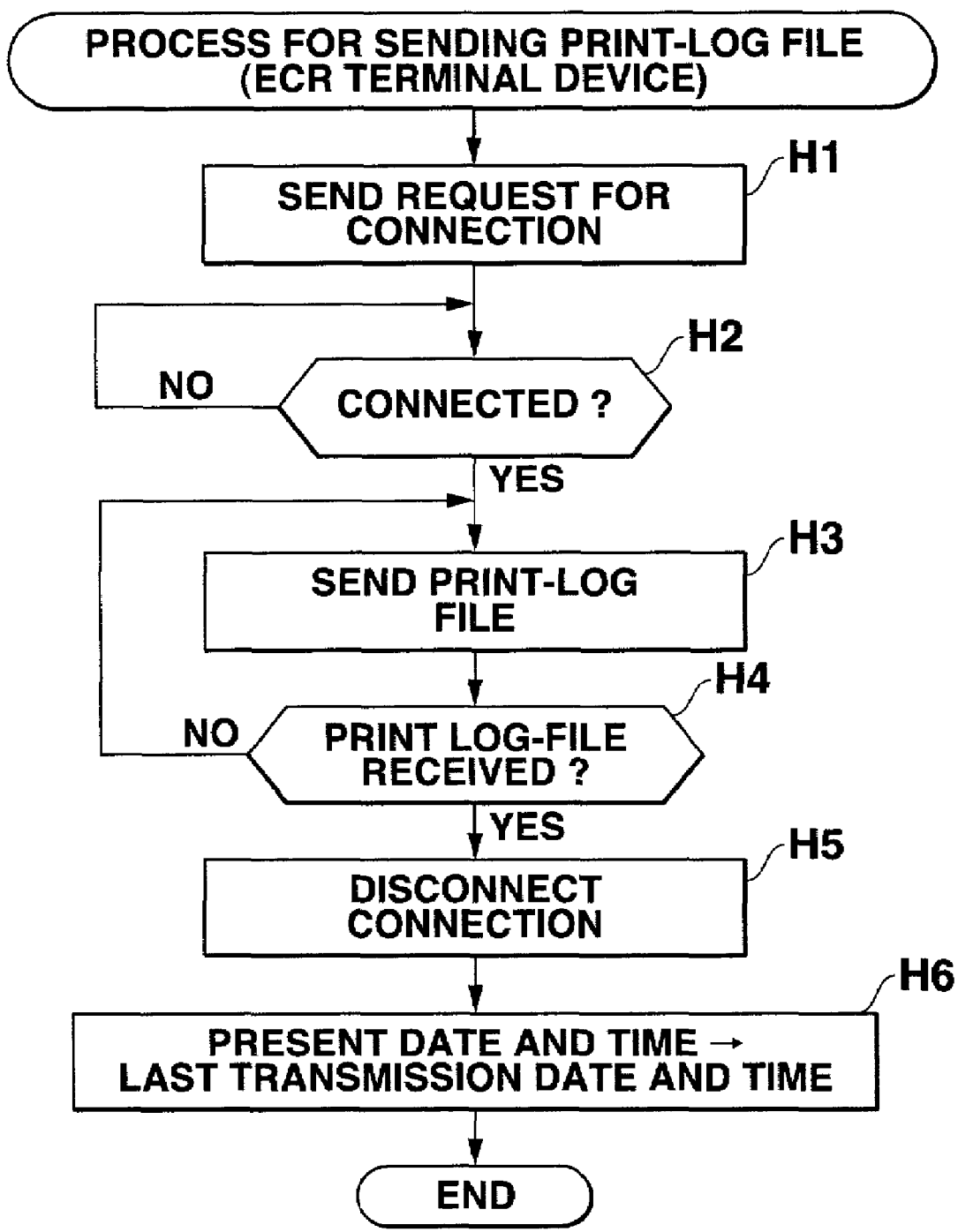
FIG. 21 is a flowchart for explaining a process for sending print-log information.
Figure 22:
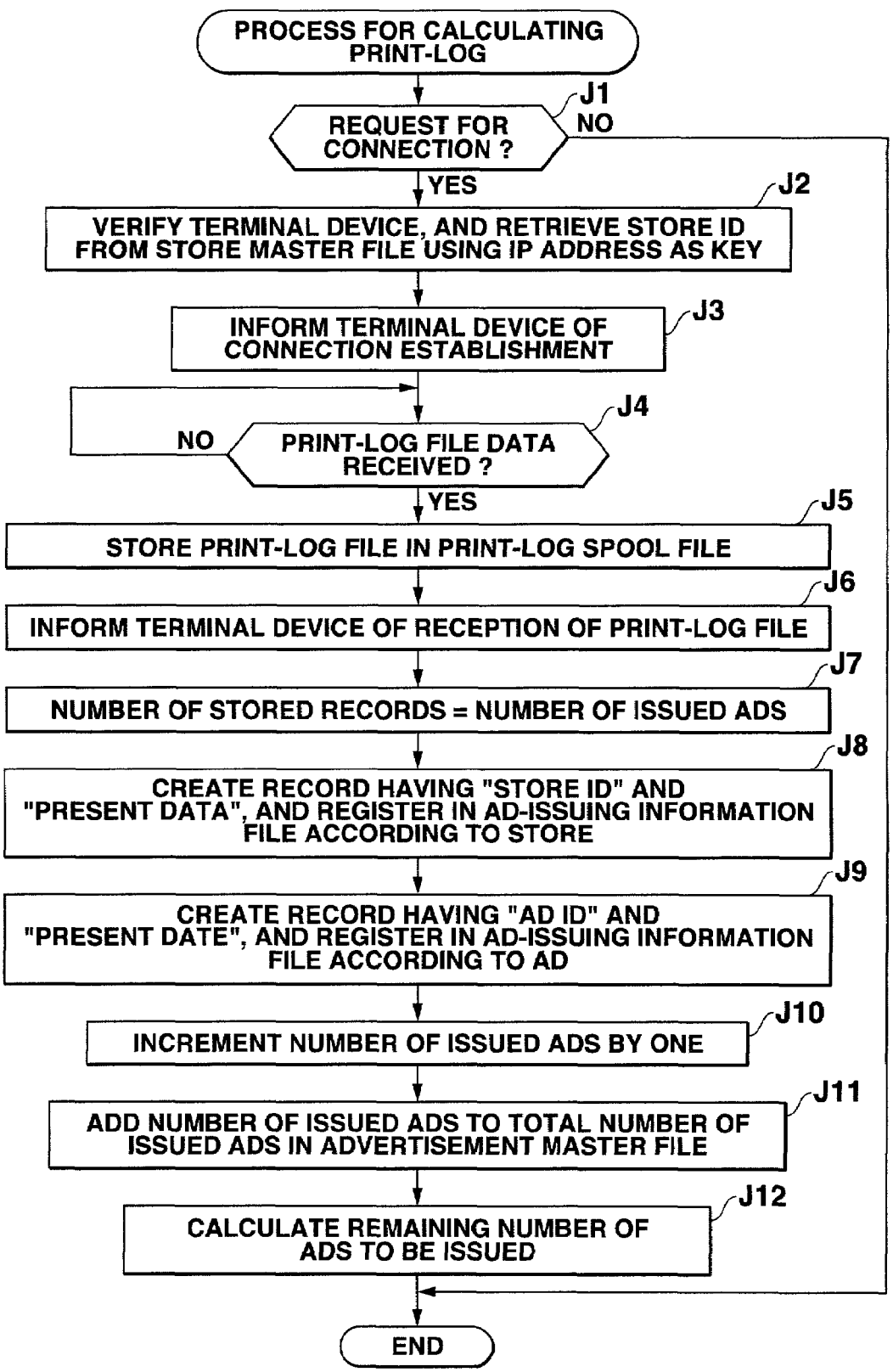
FIG. 22 is a flowchart for explaining a process for calculating amounts of issued advertisements, which is carried out by the server computer 2.

FIG. 21 is a flowchart for explaining the process E3 which is carried out by the ECR terminal device 3. FIG. 22 is a flowchart for explaining the process S6 which is carried out by the server computer. The server computer 2 receives print log files sent from the ECR terminal device 3, and classifies the files according to advertisement and store. Then, the server computer 2 carries out a process for collecting log data to be written in the corresponding files F3 and F4.

The ECR terminal device 3 sends a connection request to the server computer 2 (Step H1). When the connection is made (Step H2), the ECR terminal device 3 sends the file F6 to the server computer 2 in the FTP format, and waits for a response therefrom (Steps H3 and H4). If the ECR terminal device 3 receives information representing that the log collection process is completed (Step H4), the ECR terminal device 3 disconnects the connection with the server computer 2 (Step H5). Then, the ECR terminal device 3 stores the present date and time, as last transmission date and time, in the file F6 (Step H6).

When the ECR terminal device 3 sends the data contents of the file F6 in the FTP format, the ECR terminal device 3 refers to the data of "Date (Year, Month, Date)" and "Printing Time" in each record, and compares the referred data with the above-described last transmission date and time. When the "Date" and "Printing Time" in the log record are previous to the last transmission date and time, the ECR terminal device 3 ignores the corresponding record, and sends any records including date information following the last transmission date and time in the process E3.

Upon reception of a connection request from the ECR terminal of a contracted store (Step J1), the server computer 2 verifies the request. When the connection request is verified as proper, the server computer 2 obtains a store ID in the store master file M2, using an IP address of the store, which is affixed to the request and sent together with the connection request, as a key (Step J2). Then, the server computer 2 establishes the communications connection with the ECR terminal device 3, and informs the ECR terminal 3 of the completion of connection (Step J3). Upon reception of the print log file from the ECR terminal device 3, the server computer 2 begins the process S6 (Step J4). After the server computer 2 temporarily stores the received print-log file in a print-log spool file (not illustrated) (Step J5), the server computer 2 sends information representing that the print-log file has been received, to the ECR terminal device 3 (Step J6).

Subsequently, the server computer 2 analyzes the data contents of the print-log file stored in the print-log spool file, and counts the number of records stored in the file. Then, the server computer 2 sets the counted number as the number of issued advertisement data items according to store, within a predetermined period of time (e.g., one-day period) (Step J7). Then, the server computer 2 sequentially creates records, each of which includes the present date and the set number of issued data items, according to store ID, and registers the created records in the file F4 (Step J8).

The server computer 2 sequentially generates a record including a data item of "Date (Year, Month, Date)" showing the present date in association with each advertisement ID, and registers the generated record in the file F3 (Step J9). Every time the print-log record is retrieved, the server computer 2 increments the data of "Number of Issued Receipts with Advertisement", corresponding to the advertisement ID included in the record, by one (Step J10). This is done sequentially from the head record stored of the print-log file stored in the print-log spool file.

Then, the server computer 2 adds the number of issued items of advertisement data in association with each advertisement ID to the data of "Total Number of Issued Receipts with Advertisement" included in a record corresponding to the same advertisement ID in the advertisement master file M1, so as to obtain the sum total of the issued receipts with advertisement (Step J11). After this, the server computer 2 subtracts the obtained sum total of the issued receipts with advertisement from the "Maximum Number of Receipts to be Issued with Advertisement" in a corresponding record of the advertisement master file M1, and sets a result of the subtracts in the "Remaining Number of Receipts to be Issued with Advertisement" (Step J12).

Print-Record Calculation Process

The server computer 2 adds the data contents of the files F3 and F4 once designated day once a month, for example, so as to achieve the process S7. The process S7 is prepared for outputting a bill for advertisement charges to advertisement provider and a payment statement to contracted store.

Figure 23:
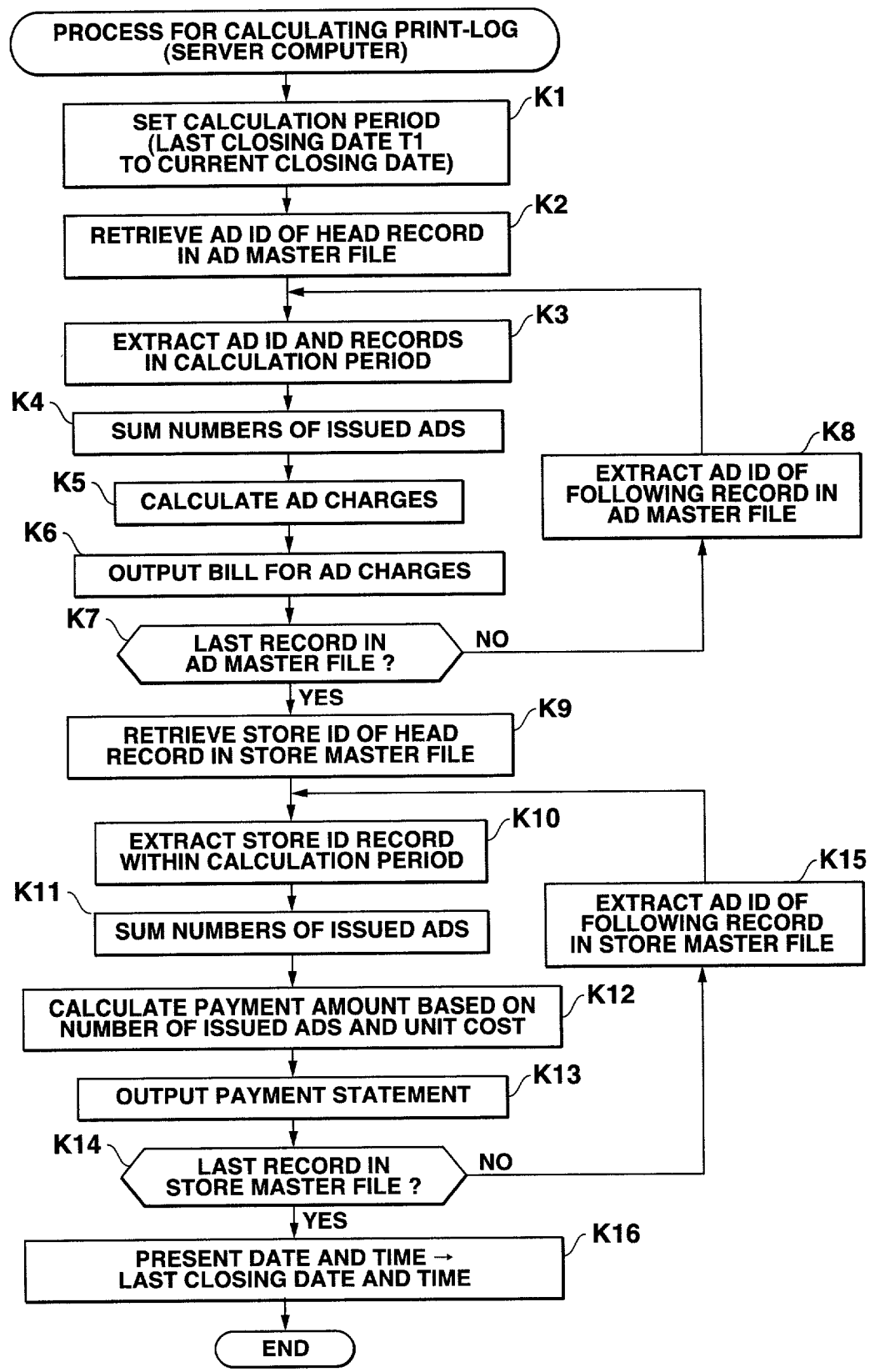
FIG. 23 is a flowchart for explaining a process for creating a bill for advertisement charges toward advertisement provider and a payment statement toward contracted store and outputting the created bill and statement.

FIG. 23 is a flowchart for explaining the process 7.

The server computer 2 sets the last closing date (Year, Month, Date) stored in a last-closing-date register (not illustrated) inside the internal memory, as the last closing date "T1". The server computer 2 sets the present date (Year, Month, Date) stored in a current-closing-date register (not illustrated), as the current closing date "T2". Then, the server computer 2 sets a period of time from the last closing date to the current closing date, as a calculation period (Step K1). The server computer 2 retrieves an advertisement ID of the head record in the advertisement master file M1 (Step K2). After this, the server computer 2 extracts a record corresponding to the retrieved advertisement ID and the calculation period (T1 to T2) from the file F3 (Step K3), and calculates the total number of issued advertisements of the extracted record (Step K4).

The server computer 2 extracts the charged unit cost for advertisement, from the corresponding record in the advertisement master file M1. The server computer 2 multiplies the extracted unit cost by the total number of issued advertisements, and calculates the charged amount for the calculation period (Step K5). The server computer 2 creates a bill based on the calculated charged amount toward advertisement provider, in accordance with a pre-set format (Step K6).

Subsequently, the server computer 2 determines whether the record extracted from the advertisement master file M1 is the last record in the file (Step K7). When determined that the extracted record is not the last record (Step K7: No), the server computer 2 retrieves the next record following the extracted record from the advertisement master file M1, and extracts an advertisement ID of the record (Step K8). Based on the extracted advertisement ID, the server computer 2 repeats the above procedures of the steps K3 to K8 until a record extracted from the advertisement master file M1 is the last record (Step K7: Yes). Having performed this, the server computer 2 creates and outputs a bill for advertisement toward advertisement provider, according to advertisement ID.

Explanations will now be made to a process for creating a payment statement toward the contracted store. This process is carried out in a similar manner to the process for creating a bill for advertisement which is directed toward the advertisement provider. That is, the server computer 2 retrieves one record included in the advertisement master file M1, obtains a store ID included in the retrieved record (Step K9), and searches the file F3 for records corresponding to the obtained store ID. At this time, the server computer 2 extracts any records corresponding to the obtained store ID and corresponding to the calculation period from "T1" to "T2" (Step K11), and calculates the total number of issued receipts with advertisement based on the data included in the extracted records (Step K11). After this, the server computer 2 extracts the payment unit cost for each advertisement included in the retrieved record of the advertisement master file M1. Then, the server computer 2 multiplies the extracted unit cost by the calculated total number of issued receipts, and calculates the payment amount for the issued advertisements for the corresponding calculation period (Step K12). At the same time, the server computer 2 creates a payment statement for advertisement in a pre-set format, with the payment amount or any other necessary information written in the statement (Step K13).

Unless the record obtained from the advertisement master file M1 is the last record in the file (Step K14: No), the server computer 2 retrieves a record following the retrieved record from the file M1, and extracts a store ID shown in the newly-retrieved record (Step K15). Based on the extracted store ID, the server computer 2 searches the file F3 (Step K10), and repeats the above-described procedures of the steps K3 to K8, until the last record is retrieved from the advertisement master file M1 (Step K7: Yes). This achieves the creating of the payment statement for advertisement toward any contracted stores having issued the advertisements.

Accordingly, the process for creating a bill for advertisement charges which is directed toward an advertisement provider and the process for creating a payment statement for issued advertisements are completed. Then, the server computer 2 sets the present date/time registered in the current-closing-date register as the last closing date, and stores the set date in the last-closing-date register (Step K16).

Advertisement Information Management Process

The server computer 2 carries out, every day, the process S8 as a service for informing a corresponding advertisement information provider of the usage context of provider advertisement using the ECR terminal device 3. During this process S8, the server computer 2 creates the file F7, and sends the reporting file F7 to the ECR terminal device 3 of each contracted store in the form of an email.

Figure 24:
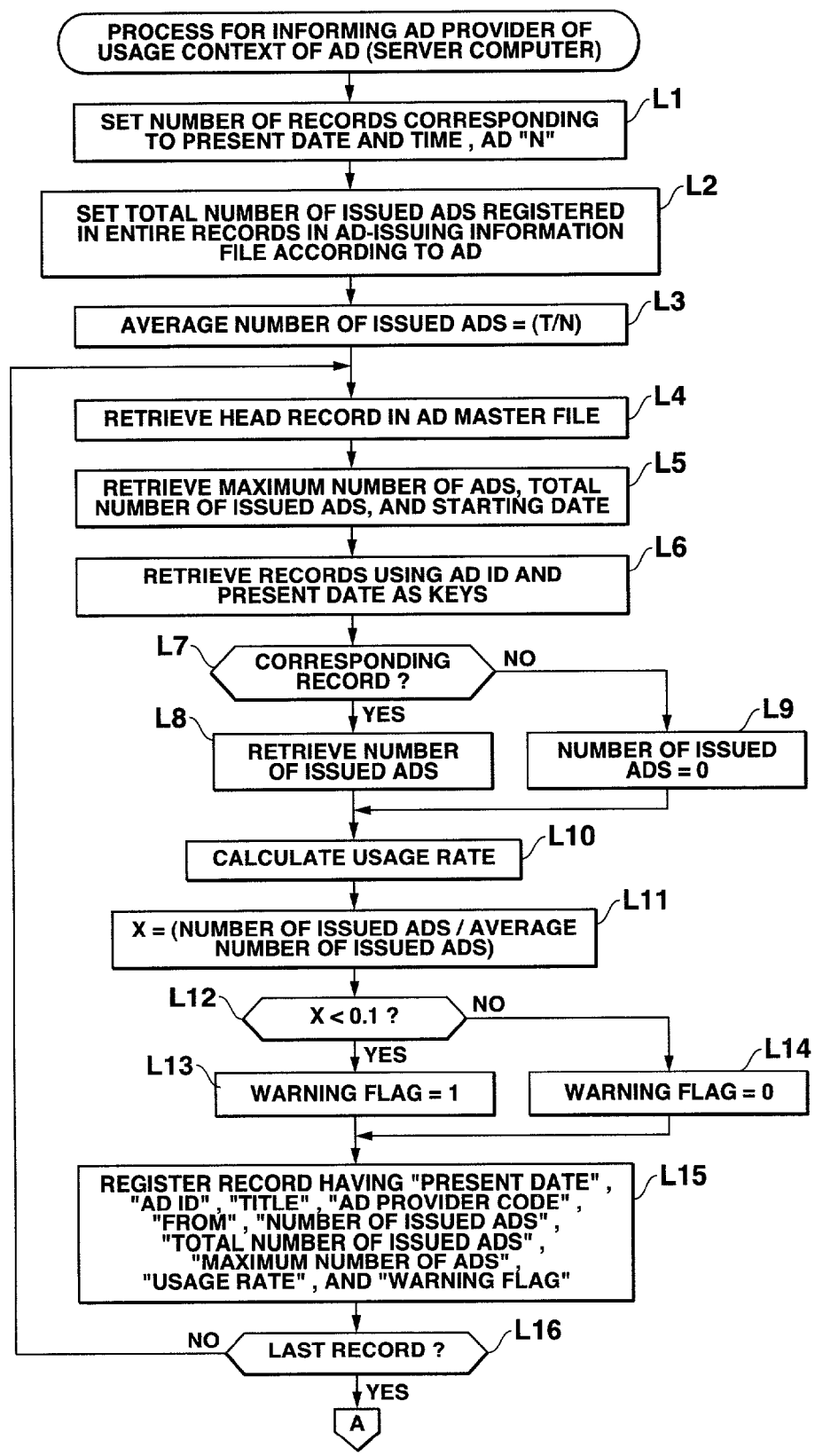
FIG. 24 is a flowchart for explaining a process for informing an advertisement provider of usage context of corresponding advertisement.
Figure 25:
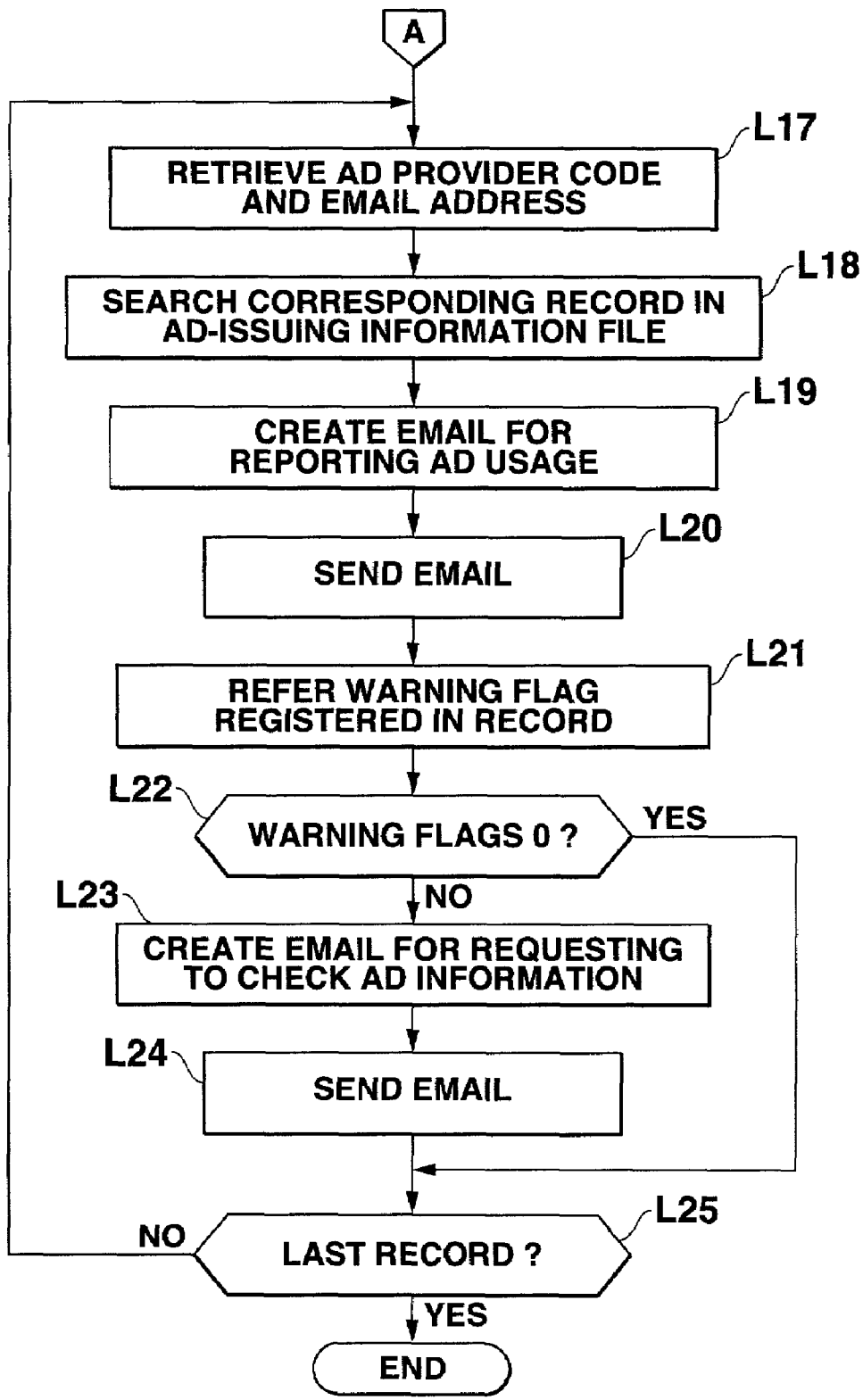
FIG. 25 is a flowchart for explaining another process for informing the advertisement provider of usage context of corresponding advertisement, which is carried out following the process of FIG. 24.

FIGS. 24 and 25 are flowcharts for explaining the process S8.

The server computer 2 searches the file F4 for any corresponding records, using the current date as a key. The server computer 2 counts the number of the corresponding records, and sets the counted number as the number "N" of advertisement data items which are issued on the current date (Step L1). The server computer 2 searches the file F4 for any corresponding records, using the current date as a key. The server computer 2 sums the numbers of issued advertisements which are registered in the corresponding records, and sets the total number of issued advertisements as the total number "T" of issued advertisements (Step L2). Then, the server computer 2 calculates the division of (Total Number of Issued Advertisements on Current Date) "T"/ (Number of Issued Advertisements on Current Date) "N". After this, the server computer 2 sets a result of the division as the average number of issued advertisements on the current date in the range of the entire contracted stores (Step L3).

The server computer 2 retrieves the head record of the advertisement master file M1 (Step L4), and extracts data of "Advertisement ID", "Title", "Advertisement Provider Code", "Maximum Number of Advertisement to be Issued", "Total Number of Issued Advertisements", and "From (Date)", from the retrieved record (Step L5). The server computer 2 searches the file F4 for any corresponding record, using the extracted advertisement ID and the present date as keys (Step L6). If there is any in the file F4 (Step L7: Yes), the server computer 2 extracts the data item of "Total Number of Issued Advertisements" registered in the record, and sets the extracted number as a parameter for use in a later-described calculation (Step L8). On the contrary, is there is no corresponding record in the file F4 (Step L7: No), the server computer 2 sets an issued number parameter "0" (Step L9).

Then, the server computer 2 performs a calculation of ("Total Number of Issued Advertisements"/"Maximum Number of Advertisements to be Issued"*100), so as to obtain a usage rate of a corresponding rate (Step L1). Further, the server computer 2 performs a calculation of ("Number of Issued Advertisements"/"Average Number of Issued Advertisements") (Step L11), and sets a result of the calculation as "X". The server computer 2 determines whether the value of "X" is larger than 0.1 ("X"<0.1). When it is determined that the value of "X" is larger than 0.1 (Step L12: Yes), the server computer 2 sets the "Warning Flag" to 1 (Step L13). On the contrary, when determined that the value of "X" is not larger than 0.1 (Step L12: No), the server computer 2 sets the "Warning Flag" to 0 (Step L14).

The server computer 2 registers data items of "Present Date", "Advertisement ID", "Title", "Advertisement Provider Code", "From (Advertising Date)", "Number of Issued Advertisements", "Total Number of Issued Advertisements", "Maximum Number of Advertisements to be Issued", "Usage Rate", and "Warning Flag", a collection of which forms each record in the file F7 (Step L15).

Until reaching the last record in the advertisement master file M1 (Step L16), the server computer reads out each record of the file (Step L4), and repeats the procedures of steps L4 to L15.

When reaching the last record in the file (Step L16: Yes), the flow advances to Step L17 of FIG. 25. In the step L17, the server computer 2 retrieves a record in the advertisement-provider master file M3, and extracts data items of "Advertisement-Provider Code" and "Email Address". The server computer 2 searches the file F7 for any corresponding keys, using the "Present Date" and "Provider Code" as keys, and retrieves corresponding record(s) (Step L18). The server computer 2 creates an advertisement-usage report in the form of an email, in accordance with a pre-set format (Step L19), and sends the created report to an addressee of a corresponding advertisement provider (Step L20). FIG. 30 shows such a report in the form of an email, which specifically reports the usage contexts of each advertisement.

Other than such a daily report in the form of an email, the server computer 2 may send an email for checking information of an advertisement to an advertisement provider having provided an advertisement which is not used as many times as desired. The server computer 2 refers to the "Warning Flag" in each record of the file F7, discriminates whether there is any "Warning Flag" set to "0", in association with each advertisement provider (Steps L21, L22). When discriminated that one record includes the "Warning Flag" set to "1" (Step L22: No), the server computer 2 creates an email for requesting to check advertisement information corresponding to the record (Step L23), and sends the created email to an advertisement provider having provided the advertisement (Step L23). On the other hand, if the entire "Warning Flag" in the file F7 are all set to "0" (Step L22: Yes), the flow advance to Step L25.

FIG. 31 shows a report for checking information of a particular advertisement in the form of an email. The report specifically shows the usage contexts of each advertisement. The contents of this report are basically the same as the contents of the above-described report. The report for checking information of advertisement includes a message for recommending to have a wider range of conditions to the corresponding advertisement provider.

Such processes for sending an email are repeated (Steps L18 to L24), until the last record in the advertisement-provider master file M3 (Step L25: Yes), while retrieving each record in the advertisement-provider master file M3 (Step L17).

As explained above, the advertisement distribution system of this embodiment extracts advertisement contents, based on the advertisement attribute information and the advertisement-provider attributes, and sends the extracted advertisement contents to each user, thereby to achieve stable usage of advertisement on the side of each advertisement user.

In addition, according to this system, the usage context of each advertisement can be managed, based on the usage data of each advertisement user. Hence, the advertisements can be advantageous both for the advertisement user and advertisement provider.

The present invention is not limited to the above embodiments. Various embodiments and changes may be made thereonto without departing from the broad spirit and scope of the invention.

In the above-described embodiment, the advertisement-provider computer 1 sends advertisement data and advertisement attribute information, etc., to the server computer 2 through the Internet. However, the advertisement data and advertisement attribute information created arbitrarily by the advertisement provider may be written on a recording medium, such as a memory card, etc. Then, the written information is distributed to the advertisement service manager. The advertisement service managers installs the recording medium into the sever computer 2, thereby the written information is registered in the server computer 2. Instead of using a memory card as a recording medium, a registration form may be distributed to each advertisement provider so as to be filled, and information written in the filled registration form is input by the advertisement service manager.

In each contracted store, the store attribute information is written in the distributed registration form which is then sent to the advertisement service manager. Otherwise, the store attribute information may be registered in the server computer 2 through the Internet.

In the above embodiment, the server computer 2 transmit advertisement data in accordance with constant request from each contracted store. However, the server computer 2 may periodically transmit the advertisement data at a predetermined time once every day after the business hours of each store, while monitoring the schedule time.

In a POS (Point Of Sales) system which is prepared in a large-scale store in master/slave arrangement, the server computer 2 of the advertisement service site may transmit advertisement data to a master device of the POS management system through the Internet. In this case, the master device may transmit advertisement data to a plurality of ECR terminal device, which are slave devices in this system and connected to each other on a LAN (Local Area Network), after having received from the advertisement service site. Particularly, while transmitting advertisement data form the server computer to the ECR terminal devices, the transmission is accomplished through one or more relayed computer devices.

When to print an advertisement, in this embodiment, the contents of each advertisement is printed following the detail statement on the front side of a receipt. However, the advertisement may be printed on the back side of the receipt. In this case, the printing is performed using a both-side printer.

In the above embodiment, only one corresponding advertisement is printed on a receipt. However, two or more advertisement may be printed on the receipt at the same time.

Additionally, the advertisement may be printed in an arbitrary form. For example, the advertisement may be printed somewhere in the detail statement or may be divided into two so as to be printed separately.

The advertisement contents may be output in the form of an audio or display message, while printing the contents on the receipt.

Instead of printing the advertisement contents on a receipt, the contents may be printed on a coupon or the like to be given to the customers.

Instead of printing the advertisement contents on a paper medium, the advertisement contents may be written on a recording medium owned by the customer, such as a compact flash card, PC card, smart medium, CD (Optical Disk), MO (Magneto-Optical) disk, FD (Floppy Disk), etc. In this case, the advertisement contents may be a picture image or motion image.

A part of money which is received from the advertisement provider to the contracted store may be given to the customers. In this case, according to the advertisement distribution system of this embodiment, the advertising is not performed to an infinite number of people, but only to a target group of people. For example, let it be assumed that the contracted store can earn 4 yen per advertisement. In this case, it is determined whether the total amount (including the tax charge) of one business transaction is calculated with odd money. When determined so, a process for excluding the odd money and setting the total amount of money without the excluded odd money is performed. According to this structure, because the change is given in the unit of 5 yens, 1-yen coins are not so many times used. This facilitates money exchange between the customer and the operator of the ECR terminal device. The average amount of money to be given to the customer for each advertisement is approximately 2 yens, after sharing the amount of money, given from the advertisement provider, between the store and the customer. In this case, a message indicating that the service for excluding the odd money is performed may be printed on the receipt. Otherwise, the service may be performed on the condition that the total amount of one business transaction is equal to or larger than a predetermined amount of money, for example, 100 yens. Such service can easily be realized by applying an existing program for excluding the odd money.

Accordingly, the operator of the ECR terminal device can easily perform the money exchange, resulting in handling more tasks. Based on this beneficial effect, the whole money paid by the advertisement provider may be given to the customer. When the total amount of money comes to a certain amount with odd money, the odd money may be excluded from the total amount of money. In this case, because the change is given in the unit of 10 yens, 1-yen coins and 5-yen coins are not necessary, thus further facilitating the money exchange between the operator the ECR terminal device and the customer.

The above-described embodiment is intended to illustrate the present invention, not to limit the scope of the present invention. The scope of the present invention is shown by the attached claims rather than the embodiment. Various modifications made within the meaning of an equivalent of the claims of the invention and within the claims are to be regarded to be in the scope of the present invention.

This application is based on Japanese Patent Application No. 2000-77991 filed on Mar. 21, 2000, and including specification, claims, drawings and summary. The disclosure of the above Japanese Patent Application is incorporated herein by reference in its entirety.

What is claimed is:

1. An advertisement distribution system which receives advertisement contents from at least one advertisement provider through a communications network, and provides at least one advertisement user with the received advertisement contents through the communication network, said system comprising:
an advertising information storage unit which stores advertisement contents received from the at least one advertisement provider in association with advertisement provider information for controlling provision of an advertisement and corresponding to the received advertisement contents;
an advertisement-user information storage unit which stores advertisement usage information for specifying a desired advertisement of the at least one advertisement user;
an advertisement extraction unit which extracts advertisement contents corresponding to advertisement provider information in association with the stored advertisement usage information; and
a transmission unit which transmits the advertisement contents extracted by said advertisement extraction unit to the at least one advertisement user having requested the advertisement contents,
wherein the advertisement provider information includes an advertisement providing condition which is to be specified by the at least one advertisement provider for predetermined advertisement contents;
the advertisement user information includes an advertisement specification condition which is to be specified by the at least one advertisement user;
the advertisement extraction unit searches an advertisement providing condition conforming to the input advertisement specification condition, and retrieves advertisement contents corresponding to the advertisement provider information including the searched advertisement providing condition;
said advertisement extraction unit includes an advertisement selection unit which selects, when more than a predetermined number of items of advertisement provider information including the searched advertisement providing condition are retrieved, a predetermined number of items of advertisement provider information included in the retrieved items of advertisement provider information; and
said advertisement selection unit generates, when more than a predetermined number of items of the advertisement provider information are retrieved, a predetermined number of random numbers which corresponds to the number of the retrieved items of advertisement provider information, and selects a predetermined number of items of advertisement provider information corresponding to the generated random numbers.

2. An advertisement distribution system which receives advertisement contents from at least one advertisement provider through a communications network, and provides at least one advertisement user with the received advertisement contents through the communications network, said system comprising:
an advertisement information storage unit which stores advertisement contents received from the at least one advertisement provider in association with advertisement provider information for controlling provision of an advertisement and corresponding to the received advertisement contents;
an advertisement user information storage unit which stores advertisement usage information for specifying a desired advertisement of the at least one advertisement user;
an advertisement extraction unit which extracts advertisement contents corresponding to advertisement provider information in association with the stored advertisement usage information; and
a transmission unit which transmits the advertisement contents extracted by said advertisement extraction unit to the at least one advertisement user having requested the advertisement contents,
wherein the advertisement provider information includes an advertisement providing condition which is to be specified by the at least one advertisement provider for predetermined advertisement contents;
the advertisement user information includes an advertisement specification condition which is to be specified by the at least one advertisement user;
the advertisement extraction unit searches an advertisement providing condition conforming to the input advertisement specification condition, and retrieves advertisement contents corresponding to the advertisement provider information including the searched advertisement providing condition; and
said advertisement extraction unit includes a changing unit, which changes an item parameter included in the advertisement specification condition when a number of items of advertisement provider information including the advertisement providing condition does not reach a predetermined number, so as to search the advertisement providing condition conforming to the changed item parameter included in the advertisement specification condition.

3. The advertisement distribution system according to claim 2, wherein said changing unit repeatedly changes a corresponding item parameter included in the advertisement specification condition, until the number of items of advertisement provider information extracted by said advertisement extraction unit reaches the predetermined number.

4. A method for receiving advertising contents sent from an advertisement provider using an advertisement provider terminal through a communications network, and sending the received advertisement contents to at least one advertisement user from an advertisement server, said method comprising the steps of:
storing the advertisement contents sent from the advertisement provider using the advertisement provider terminal and advertisement attribute information in association with each other;
storing advertisement user information sent from the at least one advertisement user using the sent advertisement contents;
retrieving advertisement attribute information conforming to the stored advertisement user information, and extracting advertisement contents corresponding to the retrieved advertisement attribute information;
sending the extracted advertisement contents to the at least one advertisement user;
receiving predetermined advertisement contents sent from said advertisement server to the at least one advertisement user and advertisement attribute information corresponding to the predetermined advertisement contents, and storing the received advertisement contents and the advertisement attribute information sequentially in received order;

outputting and specifying one of the advertisement contents included in the stored advertisement contents, when using an advertisement;

outputting the advertisement contents specified by said outputting step;

updating and retaining, every time the advertisement content is output by said outputting step, advertisement-usage-context management information corresponding to the advertisement content;

sending the advertisement usage context management information retained by said updating and retaining step to said advertisement server at predetermined intervals;

obtaining a number of output advertisement contents included in the advertisement usage context management information sent to said advertisement server from said at least one advertisement user in said sending step;

determining whether the obtained number of output advertisement contents exceeds a maximum number of to be provided advertisement included in the stored advertisement attribute information; and when it is determined that the obtained number of output advertisement contents has exceeded the maximum number of to-be provided advertisements, removing the advertisement content from target advertisement contents to be extracted by said extracting step.

5. The method according to claim 4, further comprising the steps of:

calculating an amount of money which is charged for advertisement charges toward the advertisement provider, based on the obtained number of output advertisement contents which is obtained by said calculating step; and issuing a bill representing the amount of money which is calculated by said calculating step, to said advertisement provider.

6. The method according to claim 4, further comprising the steps of:

calculating a payment amount to be paid to the advertisement user, based on the obtained number of output advertisement contents obtained by said obtaining step; and issuing a payment statement representing the payment amount to be paid which is calculated by said calculating step.

7. A computer readable recording medium which records a program for controlling a computer function as:

an advertisement information storage unit which stores advertisement contents received from the at least one advertisement provider in association with advertisement provider information for controlling provision of an advertisement and corresponding to the received advertisement contents;

an advertisement user information storage unit which stores advertisement usage information for specifying a desired advertisement of the at least one advertisement user;

an advertisement extraction unit which extracts advertisement contents corresponding to advertisement provider information in association with the stored advertisement usage information; and a transmission unit which transmits the advertisement contents extracted by said advertisement extraction unit to the at least one advertisement user having requested the advertisement contents, wherein the advertisement provider information includes an advertisement providing condition which is to be specified by the at least one advertisement provider for predetermined advertisement contents;

the advertisement user information includes an advertisement-specification condition which is to be specified by the at least one advertisement user;

the advertisement extraction unit searches an advertisement providing condition conforming to the input advertisement-specification condition, and retrieves advertisement contents corresponding to the advertisement provider information including the searched advertisement providing condition;

said advertisement extraction unit includes an advertisement selection unit which selects, when more than a predetermined number of items of advertisement provider information including the searched advertisement providing condition are retrieved, a predetermined number of items of advertisement provider information included in the retrieved items of advertisement provider information; and said advertisement selection unit generates, when more than a predetermined number of items of the advertisement provider information are retrieved, a predetermined number of random numbers which corresponds to the number of the retrieved items of advertisement provider information, and selects a predetermined number of items of advertisement provider information corresponding to the generated random numbers.

8. A computer readable recording medium which records a program for controlling a computer function as:

an advertisement information storage unit which stores advertisement contents received from the at least one advertisement provider in association with advertisement provider information for controlling provision of an advertisement and corresponding to the received advertisement contents;

an advertisement user information storage unit which stores advertisement usage information for specifying a desired advertisement of the at least one advertisement user;

an advertisement extraction unit which extracts advertisement contents corresponding to advertisement provider information in association with the stored advertisement usage information; and a transmission unit which transmits the advertisement contents extracted by said advertisement extraction unit to the at least one advertisement user having requested the advertisement contents, wherein the advertisement provider information includes an advertisement providing condition which is to be specified by the at least one advertisement provider for predetermined advertisement contents;

the advertisement user information includes an advertisement-specification condition which is to be specified by the at least one advertisement user;

the advertisement extraction unit searches an advertisement providing condition conforming to the input advertisement-specification condition, and retrieves advertisement contents corresponding to the advertisement provider information including the searched advertisement providing condition; and said advertisement extraction unit includes a changing unit, which changes an item parameter included in the advertisement specification condition when a number of items of advertisement provider information including the advertisement providing condition does not reach a predetermined number, so as to search the advertisement providing condition conforming to the changed item parameter included in the advertisement specification condition.

* * * * *